(12) United States Patent
De Souter et al.

(10) Patent No.: US 8,250,033 B1
(45) Date of Patent: Aug. 21, 2012

(54) REPLICATION OF A DATA SET USING DIFFERENTIAL SNAPSHOTS

(75) Inventors: Marc De Souter, Wayne, NJ (US); Pranit Sethi, Piscataway, NJ (US)

(73) Assignee: EMC Corporation, Hopkinton, MA (US)

( * ) Notice: Subject to any disclaimer, the term of this patent is extended or adjusted under 35 U.S.C. 154(b) by 514 days.

(21) Appl. No.: 12/240,666

(22) Filed: Sep. 29, 2008

(51) Int. Cl.
*G06F 17/30* (2006.01)

(52) U.S. Cl. ....................................... 707/637

(58) Field of Classification Search .................. None
See application file for complete search history.

(56) References Cited

U.S. PATENT DOCUMENTS

| | | | |
|---|---|---|---|
| 6,434,681 B1 | 8/2002 | Armangau | |
| 6,792,518 B2 | 9/2004 | Armangau et al. | |
| 6,934,822 B2 | 8/2005 | Armangau et al. | |
| 6,957,362 B2 | 10/2005 | Armangau | |
| 7,035,881 B2 | 4/2006 | Tummala et al. | |
| 7,191,284 B1 * | 3/2007 | Gupta et al. | 711/114 |
| 7,191,299 B1 * | 3/2007 | Kekre et al. | 711/162 |
| 7,284,016 B2 | 10/2007 | Venkatesh et al. | |
| 7,293,154 B1 * | 11/2007 | Karr et al. | 711/202 |
| 7,296,125 B2 | 11/2007 | Ohran | |
| 7,523,278 B2 | 4/2009 | Thompson et al. | |
| 7,546,431 B2 | 6/2009 | Stacey et al. | |
| 7,549,028 B2 | 6/2009 | Thompson et al. | |
| 7,555,504 B2 | 6/2009 | Bixby et al. | |
| 7,567,991 B2 | 7/2009 | Armangau et al. | |
| 7,653,793 B1 * | 1/2010 | Garthwaite | 711/159 |
| 7,676,514 B2 | 3/2010 | Faibish et al. | |
| 7,716,171 B2 | 5/2010 | Kryger | |
| 7,716,185 B2 | 5/2010 | Thompson et al. | |
| 7,716,435 B1 | 5/2010 | Allen | |
| 7,734,591 B1 * | 6/2010 | Mercier et al. | 707/639 |
| 7,831,682 B2 * | 11/2010 | Certain et al. | 707/639 |
| 7,870,355 B2 * | 1/2011 | Erofeev | 711/162 |
| 2003/0182330 A1 * | 9/2003 | Manley et al. | 707/205 |
| 2005/0027748 A1 * | 2/2005 | Kisley | 707/200 |
| 2005/0065986 A1 | 3/2005 | Bixby et al. | |
| 2006/0047928 A1 * | 3/2006 | Bhasin et al. | 711/162 |
| 2006/0143412 A1 | 6/2006 | Armangau | |
| 2008/0028009 A1 * | 1/2008 | Ngo | 707/204 |

* cited by examiner

*Primary Examiner* — Bai D. Vu
(74) *Attorney, Agent, or Firm* — Muirhead and Saturnelli, LLC

(57) ABSTRACT

A replication process using snapshots to maintain information regarding changes made to a production data set following a point in time. In some embodiments, the production data set may be a file system and the snapshot may store information relating to changes made to both previously-allocated and newly-allocated data blocks. When a change is made to a previously-allocated data block, the original contents for the data block may be copied to a save volume prior to being overwritten by the new data, while for a newly-allocated data block no data may be copied to the save volume. An entry may also be created in a map identifying each changed data block. A replication process may then read the block map to identify data blocks storing new data to should be replicated to a replication data set, such that the replication data set remains a copy of the production data set.

23 Claims, 13 Drawing Sheets

BLOCK MAP
300

| Production Data Volume Address | Save Volume Address |
|---|---|
| A7-00-F9-6B | B9-45-67-E8 |
| 9D-8B-31-0C | 8A-AA-3E-44 |
| 5F-F5-73-AB | 00-00-00-00 |

302
ENTRY

REPLICATION OF A DATA SET USING DIFFERENTIAL SNAPSHOTS

BACKGROUND OF INVENTION

1. Field of Invention

Embodiments of the present invention relate to techniques for performing replication of a data set from a first location to a second location using snapshots to track and store information relating to changes made to the data set.

2. Discussion of Related Art

Copying data from a first location (e.g., including one or more data volumes) to a second is a common task in data storage systems. This may be done for a myriad of reasons, including replication and backup/versioning. In a replication operation, a data set may be copied from the first location to the second to ensure that the second is a mirror of the first and that each stores a copy of the data set such that if there is a failure that results in the data set being in accessible from the first location, the second is available for access. In a backup/versioning operation, a "copy on write" technique can be employed such that changes to the data set made after the point in time result in copies of the original data that was stored in the first data volume at the point in time being copied to a save volume—a data volume acting as, for example, a backup location—before being overwritten in the first volume. In this way, the data set can be "rolled back" to the point in time.

One illustrative technique for forming a point in time copy of a data set is referred to as a snapshot and is described in detail in U.S. Pat. No. 6,792,518 to Armangau et al., which is incorporated herein by reference in its entirety.

A snapshot does not replicate a full copy of the data set (referred to as a production data set). Rather, the snapshot only stores differences between a current version of the production data set and the version of the data set at the point in time when the snapshot was taken. In the implementation described in the '518 patent, the snapshot maintains several data structures, including a block map. When a snapshot is created at time $T=0$, these data structures, including the block map, may be empty, and they are populated when the data set is written to after the creation of the snapshot. For example, when contents of a first data block in the production data set are about to be changed as a result of a data write operation conducted after time $T=0$ (e.g., time $T=0.5$), the original contents of the data block are copied to a save volume such that a copy of a state of the data block at the time the snapshot was created (i.e., the contents of the data block at time $T=0$) is maintained. An entry is then placed into the block map linking the data block in the save volume to its corresponding position in the point in time data set that the snapshot represents. This can be repeated over time, for each change made to the production data set after the snapshot was created, such that the block map contains an entry for each changed data block.

The block map of the snapshot can then be used at a later time (e.g., time $T=10$) to determine the state of production first data set at the time the snapshot was created (time $T=0$) even if it has changed since $T=0$. To do so, a read operation to the snapshot for a selected data block will access the block map to determine if the block map contains an entry for that selected data block. If so, it can be determined that the selected data block changed after the snapshot was created and that the data stored in the production data set is not the data that was stored in the selected data block at time $T=0$. The information stored in the entry in block map will then be accessed to determine the location of the corresponding data and will read the data from the save volume that is the data that was stored in the selected data block in the first data volume at time $T=0$. If, however, there is no entry in the block map for the selected data block, then it can be determined that the data did not change after the creation of the snapshot, and that the data stored in the production data set is the data that was stored at time $T=0$. Accordingly, the data can be read from the production data set.

Multiple snapshots can also be created at different times, and can work together in a serial fashion so that only the most recently created snapshot directly tracks changes to the production data set. For example, if a data block was overwritten after time $T=0$ but also after time $T=1$, when a second snapshot was created, the snapshot at time $T=0$ may not reflect that the selected data block was changed, but the snapshot created at time $T=-1$ will. The snapshot created at time $T=1$ may have its own block map containing addresses of data blocks on the save volume storing the contents of data blocks overwritten after time $T=1$. In response to a read operation, carried out at time subsequent to $T=1$ to the snapshot at time $T=0$, it may be determined from the snapshot at time $T=1$ that the selected data block in the production volume was overwritten subsequent to $T=0$, so that the data block that existed at $T=0$ can be retrieved (using the block map for snapshot $T=1$), from the save volume.

As should be appreciated from the foregoing, snapshots can be used to determine previous states of a data set at past times without needing to make a full copy of the data set at those past times. Instead, only the "deltas" or differences are stored in snapshots.

SUMMARY OF INVENTION

In one embodiment, there is provided a method of tracking changes to a file system subsequent to a point in time, in which the file system stores data in units of storage on at least one storage medium. The method comprises, in response to an operation that results in writing a first set of data to the file system subsequent to the point in time, an act of determining whether the operation results in the file system writing at least some of the first set of data to at least one first unit of storage that was previously allocated to the file system and stored data for the file system. When it is determined that the operation results in the file system writing at least some of the first set of data to at least one first unit of storage that was previously allocated to the file system and stored data for the file system, the method performs acts of creating an entry in at least one map indicating that the at least one unit of storage was modified subsequent to the point in time, and copying data stored in the at least one unit of storage prior to the operation to at least one save volume. The method further comprises an act of determining whether the operation results in the file system writing at least some of the first set of data to at least one second unit of storage that did not store data for the file system. When it is determined that the operation results in the file system writing at least some of the first set of data to at least one second unit of storage that did not store data for the file system, the method performs acts of creating an entry in the at least one map indicating that the at least one unit of storage was modified subsequent to the point in time, and refraining from copying any data stored in the at least one unit of storage to the at least one save volume.

In another embodiment, there is provided at least one computer-readable storage medium having encoded thereon computer-executable instructions that, when executed by at least one computer, perform a method for tracking changes to a file system subsequent to a point in time, in which the file system stores data in units of storage on at least one storage medium.

The method comprises, in response to an operation that results in writing a first set of data to the file system subsequent to the point in time, an act of determining whether the operation results in the file system writing at least some of the first set of data to at least one first unit of storage that was previously allocated to the file system and stored data for the file system. When it is determined that the operation results in the file system writing at least some of the first set of data to at least one first unit of storage that was previously allocated to the file system and stored data for the file system, the method performs acts of creating an entry in at least one map indicating that the at least one unit of storage was modified subsequent to the point in time, and copying data stored in the at least one unit of storage prior to the operation to at least one save volume. The method further comprises an act of determining whether the operation results in the file system writing at least some of the first set of data to at least one second unit of storage that did not store data for the file system. When it is determined that the operation results in the file system writing at least some of the first set of data to at least one second unit of storage that did not store data for the file system, the method performs acts of creating an entry in the at least one map indicating that the at least one unit of storage was modified subsequent to the point in time, and refraining from copying any data stored in the at least one unit of storage to the at least one save volume.

In a further embodiment, there is provided an apparatus comprising at least one processor programmed to track changes to a file system subsequent to a point in time, the file system storing data in a plurality of units of storage of at least one storage medium. The at least one processor is programmed to, in response to an operation that results in writing a first set of data to the file system subsequent to the point in time, determine whether the operation results in the file system writing at least some of the first set of data to at least one first unit of storage that was previously allocated to the file system and stored data for the file system. The at least one processor is programmed to, when it is determined that the operation results in the file system writing at least some of the first set of data to at least one first unit of storage that was previously allocated to the file system and stored data for the file system, perform acts of creating an entry in at least one map indicating that the at least one unit of storage was modified subsequent to the point in time, and copying data stored in the at least one unit of storage prior to the operation to at least one save volume. The at least one processor is further programmed to determine whether the operation results in the file system writing at least some of the first set of data to at least one second unit of storage that did not store data for the file system. The at least one processor is programmed to, when it is determined that the operation results in the file system writing at least some of the first set of data to at least one second unit of storage that did not store data for the file system, perform acts of creating an entry in the at least one map indicating that the at least one unit of storage was modified subsequent to the point in time, and refraining from copying any data stored in the at least one unit of storage to the at least one save volume.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 3 is a block diagram of one data structure that may be used for storing information relating to changes made to a data volume in accordance with some embodiments of the invention;

DETAILED DESCRIPTION

Figure 1:
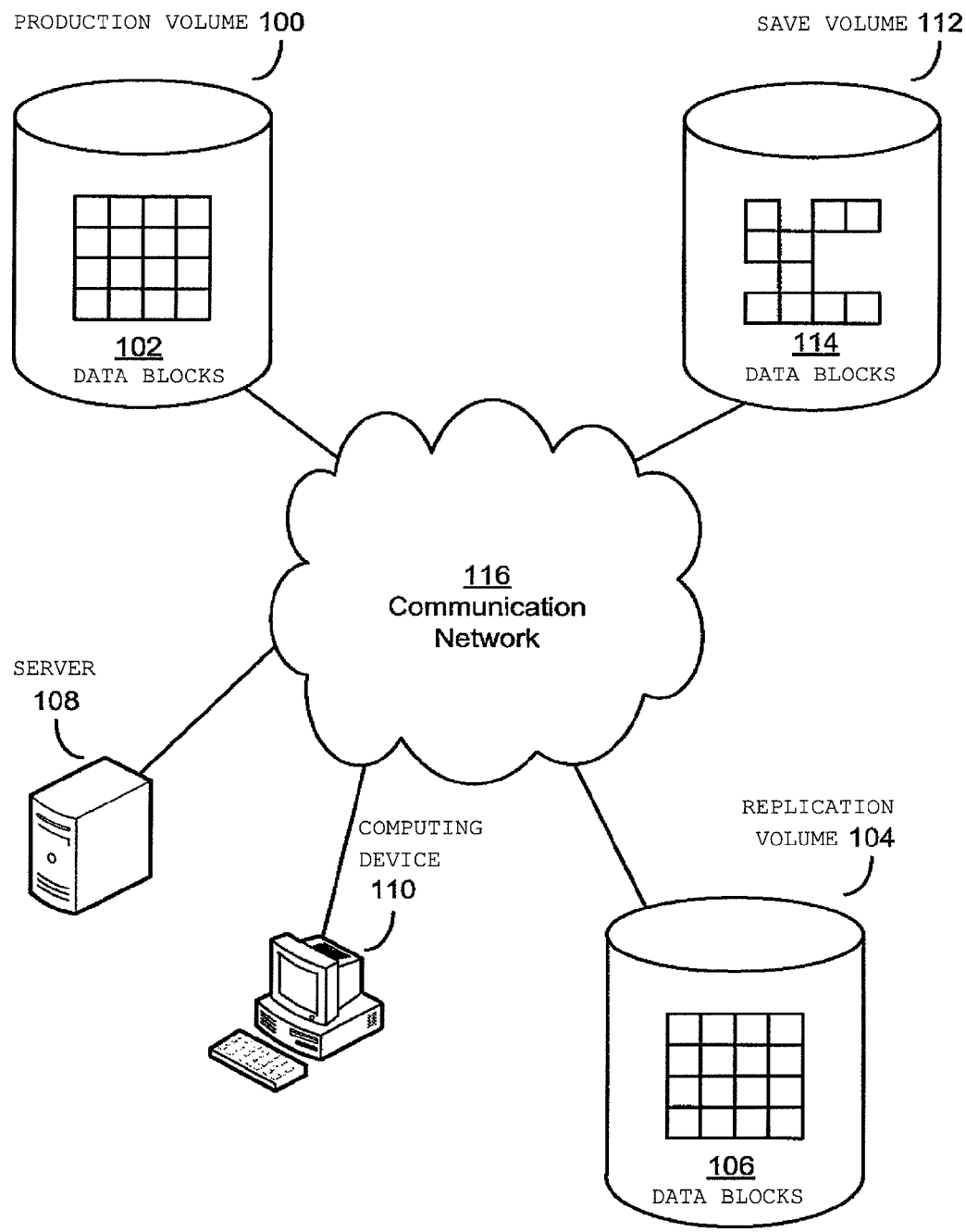
FIG. 1 illustrates an exemplary computer system on which some embodiments of the invention may be implemented.

In replication processes, two or more data sets are maintained in a mirrored state such that there is a redundant copy of the data stored in the data set. A mirror provides fault tolerance by providing an additional copy of the data set that can be used to maintain business continuity if the production data set becomes unavailable (e.g., due to failure). A replication process may be synchronous (i.e., data is stored to the mirror as it is committed to the production data set) or asynchronous. Asynchronous replication volumes may therefore be a few seconds, minutes, or even hours out of sync with the data volume, according to the particular replication processes implemented.

Applicants have appreciated snapshots may be used advantageously in a different way (e.g., rather than to perform backup/versioning, they may be used to facilitate replication). In this respect, Applicants have appreciated that one of the characteristics of the block map created for a snapshot is that it includes entries that track blocks that have changed subsequent to the time that the snapshot was created. Thus, by employing a series of snapshots separated based upon any desired time interval, as discussed in more detail below, the block maps for the snapshots can be used to identify the data blocks that have changed during any particular time interval, and can be used to replicate the newly-changed data blocks to a replication data set.

Applicants have appreciated that some sophisticated snapshot tools provide a feature that results in efficiently creating a point in time copy (e.g., for backup/versioning) but that makes the snapshot incompatible with performing replication. For example, a capability referred to as SmartSnap available in the SnapSure facility for creating snapshots available from EMC Corporation of Hopkinton, Mass., may render a snapshot incompatible with replication techniques. Prior to the development of the SmartSnap feature, any time a write was performed to a production data set, an entry was made for any written data blocks in the block map for the corresponding snapshot and the corresponding data blocks that were overwritten were copied to the save volume. A value-added feature of the SmartSnap capability is the recognition that when writes occur to data blocks in the production data set that did not previously include valid data (e.g., where the data set is a file system and the newly written data blocks were previously unallocated to the file system), it was unnecessary for the purpose of creating a point-in-time copy of the production data set to either update the block map or copy the overwritten data blocks to the save volume, as there was no good data being overwritten that existed as of the point-in-time that the snapshot represents. Thus, in accordance with the SmartSnap feature, when a write occurs that overwrites any data block that does not include data that was valid as of the point-in-time that the snapshot represents, the block map is not updated and any overwritten data is not copied to the save volume.

Applicants have appreciated that when a snapshot facility is used to support a replication process, all changes made to a data set preferably should be tracked such that all new data written to the data volume may be replicated to the replication volume. Tracking and replicating only changes made to storage units (e.g., data blocks) that stored valid data when snapshot was created may result in the replication process only copying some data and not all, resulting in replication volumes that are not accurate mirrors of the data set.

It is contemplated that snapshots could be used to support replication but do not employ such a feature such as the SmartSnap feature discussed above, so that when new data is written to the data set after the creation of snapshot, the block map and save volume are updated irrespective of whether the write is overwriting valid data that existed in the data set at the time the snapshot was created. For example, when the data set is a file system, a snapshot utility that does not employ a feature such as the SmartSnap feature could be employed that treats all write operations that write to data blocks used by the file system irrespective of whether those data blocks were allocated to the file system and included valid data at the time snapshot was created. If such a snapshot utility were employed to support replication, the block map or a snapshot would include an accurate indication of any blocks written with new data subsequent to the time that the snapshot were created and could be employed to identify new data to be transferred to the target location by the replication process. However, employing a snapshot utility of this type would fail to leverage a significant advantage of a feature such as the SmartSnap feature, i.e., achieving efficiencies in the snapshot facility by not wasting space in the save volume and processing resources to copy whatever indeterminate data in a previously unused data unit (e.g., the data block that was not previously allocated to a file system) has been overwritten. For example, time must be taken to copy values that are not data, but rather are only "garbage" values, between the data volume and the save volume—which may take a large amount of time in some environments—and these entries must be considered and evaluated when reviewing data structures of the snapshot. This increases the amount of time necessary to create, maintain, and use a snapshot. Further, by storing the residual values (i.e., the "garbage" values) in the save volume, storage space is used in the save volume that does not need to be used; thus storage space is wasted.

Applicants have recognized and appreciated that if snapshots could be adapted to store information relating to changes made to a data volume that impacted both previously-used portions of the data volume as well as newly-used portions of the data volume, but that do not create copies of overwritten data that is not valid, then replication techniques could take advantage of snapshots in identifying changes made to a data volume that need to be replicated to a replication volume without significantly degrading the performance of the snapshot facility. Accordingly, described herein are various principles that may be implemented in replication techniques for creating, managing, and using snapshots that store information relating to changes made to both previously-allocated and newly-allocated storage units.

As used herein, a "snapshot" is any suitable collection of data structures that create a copy-on-write point in time copy of a data set and store information relating to changes made to one or more data sets that affect both data units that store valid data for the data set when snapshot is created and those that do not. A snapshot may be associated with a point in time—for example, the time it was created or applied—and adapted to store information regarding changes made to a data set after that point in time. The data set for the snapshot may be specified in any suitable manner, including by specifying some collection of logically related storage objects (e.g., a file system or database), one or more volumes of storage, or in any other suitable manner. The data structures may include a data unit map that identifies data units (e.g., data blocks or other subfile data units) that have changed subsequent to creation of the data snapshot and an associated data state storing valid data overwritten after creation of the snapshot. In the case of a newly-allocated data unit (e.g., a block allocated to a file system after creation of the snapshot), the data unit may include an identifier for the data unit and an indication that it is newly-allocated. This indication may take any suitable form, including a null value or blank indication, a reserved value marking it as a newly-allocated data unit, or an identifier for one or more reserved data units in the save volume with which newly-allocated storage units are associated.

In some illustrative embodiments described below, the data set for which a snapshot is taken to support replication is a file system and the data units therefore are referred to as data blocks that are allocated to the file system. Correspondingly, the data structures that support the snapshot are referred to as a block map and a save volume. However, it should be appreciated that these are merely examples, and that the aspects of the present invention described herein can be used in connection with creating snapshots to support replication for other types of data sets. In addition, the level of data units that are tracked as being changed need not correspond to data blocks, but can be any suitable data unit, with the data structure referred to as a "block map" being merely illustrative of any suitable type of data unit map. Similarly, it should be appreciated in the embodiments of the present invention described herein are not limited to use with a snapshot facility that employs particular data structures identified as a block or data unit map and a save volume, and can be used with snapshot facilities that employ any suitable type of data structure or structures.

In some implementations, a snapshot may be adapted to be used only by replication processes, and as such may only store information which is to be used by a replication process. However, in accordance with other embodiments of the present invention, a snapshot that is used by a backup/versioning process or any other data copying operation may also be used to support a replication process, and accordingly the snapshot may store information usable by both types of processes. Such implementations may be advantageous in some, but not all, environments because the processing load associated with creation and maintenance of snapshots may be shared between the different types of operations, such that no redundant operations are performed by creating parallel snapshots (e.g., a snapshot for replication and a snapshot for backup/versioning).

As discussed above, in one illustrative embodiment, a replication process may be supported by a snapshot implemented to track changes made to a data set (referred to as a production volume because it is capable of receiving writes) that is divided into a plurality of storage units known as data blocks. As with conventional snapshots, when a write operation makes a change to the data set that results in contents of a previously-used data block being modified, the original contents of the data block may be copied to a storage location (e.g., a "save volume") that supports the snapshot, and an entry may be placed in a block map identifying both the changed data block in the production volume and the data block in the save volume storing the original data. For example, the block map may include the address of the data block in the production volume and the address of the data block in the save volume. When a write operation makes a change to the to production volume that results in data being stored in a data block that was not previously used (e.g., where the snap is of a file system and the block was unallocated), then an entry may also be placed in the block map. However, as there is no need to copy and store the original contents of the data block—as there were no valid original contents—the entry placed into the block map may be different. This entry may instead identify the new data block in the production volume by storing, for example, the address of the data block in the production volume, and may indicate that it is a newly-used data block by including in the place of the identifier for a block in the save volume one or more reserved values indicating that it is newly-used.

In accordance with some embodiments, one or more replication processes can then be performed using the information stored in the block map to identify changed data units. All of the entries in a block map for a snapshot relate to data units that have been changed on the production volume since the snapshot was created, so accessing the block map provides a quick and simple way to identify each of the changed storage units and, accordingly, identify the location of all of the new data on the production volume that should be replicated to the replication location. The replication may use the identifiers for all the changed blocks on the production volume to retrieve the new data on the production volume, and the new data may then be copied to the replication location to ensure that the replication location is a mirror of the production volume after each of the write operations that changed the production volume are completed. In addition, the save volume also includes all of the original data that existed on the production volume when the snapshot was created but was overwritten, so that the snapshot can be used not only to support a replication process, but also to provide a valid point in time copy of the production volume for any other suitable purpose (e.g., backup/versioning).

The illustrative example provided above is a fairly simple one, wherein only a single snapshot is created and can be used by a replication process to identify data units that have changed subsequent to the creation of the snapshot. The aspects of the present invention described herein are not limited to such a simple implementation, as numerous other implementations (examples of which are discussed below) are possible. For example, as discussed above, some snapshot utilities provide the capability to create a series of snapshots and record changes to the production volume only in the most recently-created snapshot, so that if it is desired to determine which data blocks have changed subsequent to creation of a particular snapshot that is not the most recent, the block maps for that snapshot and any snapshots created later in time may be consulted, and such a snapshot facility can be used to support replication using the techniques described herein. Similarly, in accordance with some embodiments with the present invention described below, a series of alternating snapshots can be created to support a replication process, such that a snapshot can be created at a particular time to track changes to the data set subsequent to that time, a replication process can replicate those data blocks to bring the target volume into sychronization with the production volume, and a new snapshot can be created to track changes to the production volume from that point forward.

The aspects of the present invention described herein may be implemented in environments including data storage systems having one or more data volumes storing data in any suitable manner. In some implementations, a data storage system may be a local data storage system, wherein storage components of a computing device are accessible to other components of the computing device such as a processor. In other implementations, a data storage system may include a computer communication network, and data volumes may be accessible over the network using any suitable storage networking protocol. These storage networking protocols may include Storage Area Network (SAN) protocols, Network-Attached Storage (NAS) protocols, or any other suitable storage networking protocol. In implementations that use these protocols, data access operations may be exchanged over the network in any suitable manner, including according to the Common Internet File System (CIFS) protocol, the Network File System (NFS) protocol, or any other suitable protocol.

A data storage system may include any suitable number of data volumes. A data volume may be any suitable entirety or portion of a logical grouping of data, and may be implemented on one or more computer-readable storage media such as hard disk drives. A data storage system may comprise any suitable number of data volumes used for any suitable reason. For example, a data storage system may have one or more production volumes storing data, and one or more replication volumes to which changes made to the data volumes are replicated such that the replication volumes mirror the data volumes as closely as possible. In some implementations, a data volume may be both a production volume that can receive changes from one or more sources and a replication volume, in that changes made to another data volume are replicated to it, such as in the case where data may be written to any of a plurality of data volumes and changes are replicated to others in the plurality of data volumes. A data storage system may also include data volumes used for any other reason, including save volumes.

A data volume may comprise a plurality of data units of any suitable size. In some implementations, these data units may each be a predetermined amount of bits and/or bytes of available storage, such as a data block. In some implementations, storage of data into one or more data blocks may be managed by a storage management facility. A storage management facility may be any suitable module that tracks allocation of data units and stores data relating to a data content unit in one or more data units. In some such implementations, the storage management facility may be a file system imposed on the data volume, and the data content unit may be files managed by the file system. When the aspects of the present invention described herein are used in connection with the replication of a file system, the file system can be of any suitable type. For example, in one embodiment of the present invention, the file system may be one provided by a NAS storage system such as any of the family of NAS systems in the Celerra family of NAS storage systems available from EMC Corporation of Hopkinton, Mass. However, it should be appreciated that the aspects of the present invention as described herein are not limited to use with any particular type of NAS storage system, are not limited to being used in replicating file systems that are provided as part of a NAS system, or to replicating file system at all.

Any suitable type of data may be stored by storage units of data volumes. In some implementations, "data" may comprise records storing information to be manipulated and/or computer-executable instructions to be executed by one or more processors. The data may be accessed by any suitable data access operation. Data access operations include any suitable action for interacting with data, including read operations reading data stored in one or more storage units, write operations writing data to one or more storage units, and observation actions determining properties of data stored in one or more storage units.

Storage units (also referred to herein as data units) to which information is written by a write operation (e.g., a data block) are described herein as being "previously allocated" if the data unit, at the time of the write operation, stores valid data for the data storage system (e.g., if it is allocated to a file system). Accordingly, a previously-allocated data block is one that contains valid data that is overwritten during a write operation and is to be maintained by the snapshot to ensure an accurate certain point in time copy is maintained for the data set, as opposed to one that did not store data at the time of the write operation. A data unit is described herein as "newly allocated" if the storage unit did not store valid data for the data set that is overwritten in response to a unit operation. It should be appreciated that "newly allocated" does not require that the data unit never held valid data; a newly-allocated data unit may be one that stored valid data at some time in the past but at the time the write operation is executed did not. For example, when the data set is a file system, a data block may be allocated to the file system at one point, became freed up (i.e., unallocated) at a later point, and then be allocated again and unwritten to. It should be further appreciated that, in some data storage systems, a storage unit may always hold a value, but that value may not be valid data—a storage unit may not be storing valid data when the value is merely a residual of data previously stored but is not reflective of valid data for the data set. For example, a value may not be data when the value stored in the storage unit was not the result of a write operation to the data set or when the storage unit was the subject of a delete or move operation that resulted in de-allocation of the storage unit such that the value in the storage unit is no longer reflective of valid data for the data set.

In data storage systems which implement a file system and divide data volumes into data blocks, a data block is previously allocated when it was allocated to the file system and stored valid data for the file system when a write operation to the data block occurs, and may be newly allocated when it was not allocated to the file system or storing valid data at the time a write operation to the data block occurs.

Several illustrative implementations will now be described. However, these are merely examples as the aspects of the present invention described herein are not limited to these or any other specific implementations.

Techniques operating in accordance with the principles described herein can be implemented in any suitable computer system comprising any suitable number and type(s) of computing devices, including any suitable number and type of network resources. FIG. 1 shows an illustrative computer system on which embodiments of the invention may be implemented. It should be appreciated, however, that other implementations may operate in any other suitable computer system.

The computer system of FIG. 1 comprises, a production data volume 100 comprising a plurality of storage units 102. In this and other examples described below, storage units may be described as data blocks, but it should be appreciated that a data volume may be divided into any other suitable storage unit. The data volume 100 is connected to and accessible by a communication network 116. Communication network 116 may be any suitable wired and/or wireless network, including a portion of a larger wired and/or wireless network, such as a home network, a subnet of an enterprise network, the Internet, or others. The computer system further comprises a replication volume 104 that comprises a plurality of data blocks 106. Replication volume 104 may be maintained as a mirror of data volume 100 through the use of replication techniques that employ a snapshot facility as described herein. When maintained as a mirror, the data blocks 106 of the replication volume 104 are copies of the data blocks 102 of the data volume 100. As discussed above and described in greater detail below, the data blocks 106 may be periodically updated by a replication process with new data written to the data blocks 102, such that at any given time the data blocks 106 may be a slightly outdated copy of the data blocks 102.

The computer system of FIG. 1 further comprises a file system server 108 managing the data blocks of the production data volume 100. The file system server 108 may manage allocation of the data blocks 102 and create a file system interface to other components within the computer system to store data related to one or more files managed by the file system. In response to a write operation, the file system server 108 may allocate, in any suitable manner, one or more data blocks 102 to store data related to a file. While the production volume 100 is shown connected directly to the communication network 116, it should be appreciated that when a file system server 108 provides a file system interface for the data stored therein, the production volume 100 may not be directly accessible to other computers in the computer system, and may be accessible indirectly only via the file system interface.

Write operations may be performed in any suitable manner. For example, the computer system may comprise a client computing device 110 that is interacting with the data volume 100 via the file system server 108 and performing data access operations. These operations may be transmitted from the client computing device 110 to the file system server 108 via the communication network 116. The file system server 108 may then determine one or more blocks that are accessed as a result of the data access operation by consulting metadata stored by the file system server 108 concerning allocation of data blocks to files. In the event of a read operation, the contents of the data blocks related to a file may be retrieved from the data volume 100 and provided to the client computing device 110. In the event of a write operation, the file system server 108 may store the new data to be written by the write operation in either a previously-allocated data block or a newly-allocated data block from among the data blocks 102.

In accordance with some of the principles described herein, the file system server 108 may host and execute a snapshot facility adapted to generate one or more snapshots to track changes made to a file system presented by the file server 108 and/or the data volume 100, and a replication facility adapted to use the snapshot(s) to replicate changes made to a file system and/or the underlying data volume 100 to the replication volume 104, such that the data blocks 102 and data blocks 106 are kept synchronized. The snapshot and replication facilities may operate in any suitable manner. In some embodiments, as with conventional snapshot operations, the snapshot facility module may use a save volume 112, comprising data blocks 114, as a storage location for data following some write operations. The data stored in the save volume 112 may be the original data stored in a previously-allocated data block when a write operation is performed that changes the contents of the previously-allocated data block. This may be done for backup/versioning operations, such that original copies of data may be maintained for later use, or for any other reason.

Figure 2:
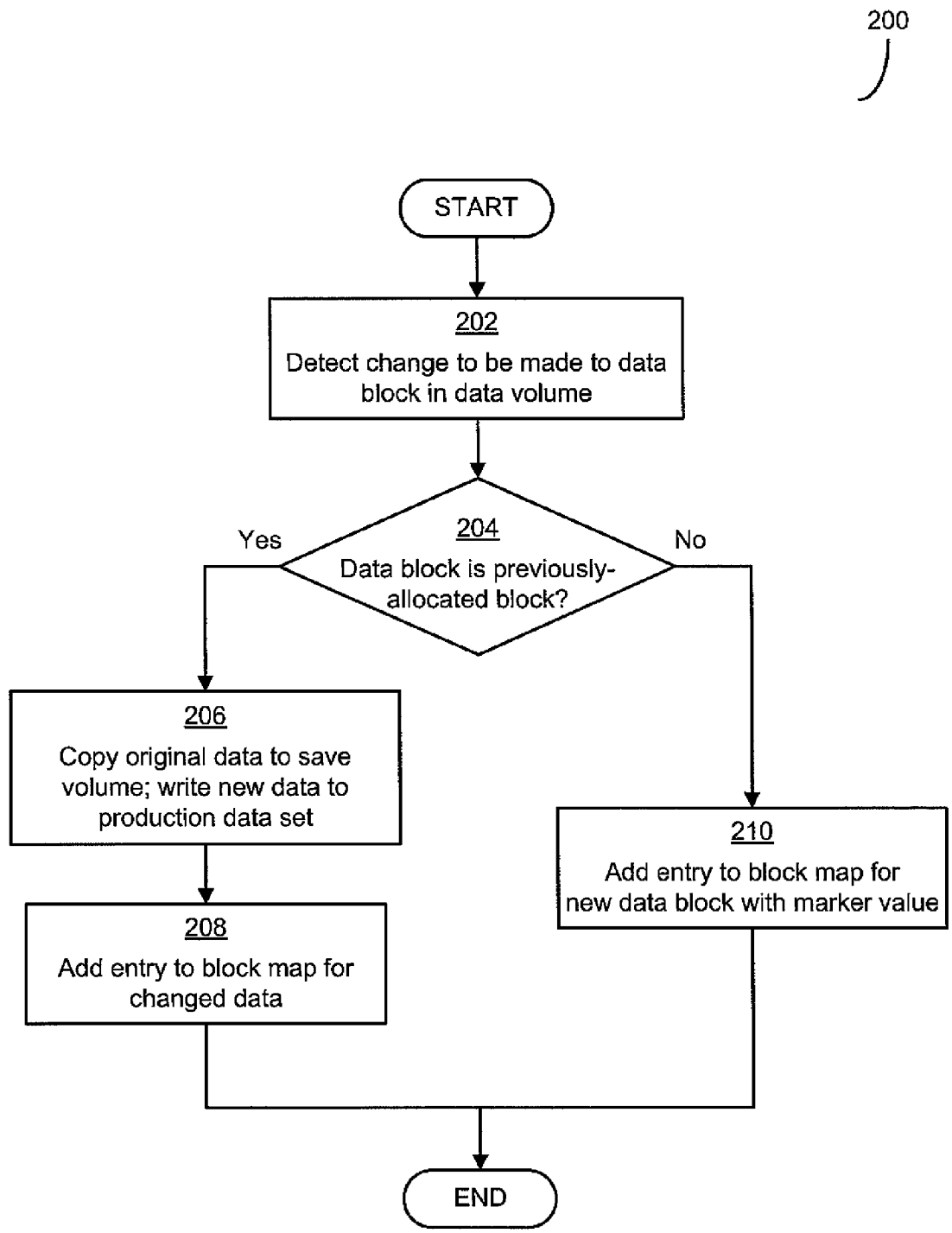
FIG. 2 is a flowchart of one illustrative technique for detecting and storing information relating to changes made to a data volume that may be implemented in accordance with some embodiments of the invention.

FIG. 2 shows a flowchart of one exemplary process that may be used by a snapshot facility implemented in accordance with some embodiments to track changes made to a production data volume such that these changes may be quickly and efficiently replicated to a replication volume by a replication facility. A snapshot facility may be implemented to track changes in any suitable manner, including tracking changes according to both conventional techniques and techniques operating in accordance with some of the principles described herein. It should be appreciated that the technique shown in FIG. 2 is only illustrative of the techniques that may be implemented in accordance with the principles described herein. Further, it should be appreciated that while the process 200 of FIG. 2 will be described with reference to the computer system of FIG. 1, process 200 is not limited to operating in a computer system of the type shown in FIG. 1, as the process 200, like all of the techniques described herein, is not limited to operating in any particular type of computer system.

The process 200 of FIG. 2 begins in act 202, in which a snapshot facility detects a change to be made to a data block of the production data volume 100. The change to be made could be prompted by any suitable action that results in a modification of the contents of at least one data block of the production data volume 100. For example, the action could be a data access operation, such as a write operation, requested by the client computing device 110 and transmitted to the file system server 108. In act 202, a snapshot facility, executing on the file system server 108 or in communication with it, may detect that the write operation to be executed by the file system server 108 will result in a change made to at least one data block of the data blocks 102 of the production data volume 100.

In act 204, the snapshot facility determines whether the particular data block is a data block that was previously-allocated or newly-allocated. As described above, a previously-allocated data block may be one that, at the time of a change, was storing valid data, and a newly-allocated data block may be one that was not storing valid data at the time of the change. In this case, determining whether a data block is previously-allocated may comprise examining metadata stored by the file system of the file system server 108. The metadata of the file system may indicate an allocation of the data blocks 102 to one or more files managed by the file system (i.e., where the file(s) are stored on the data volume), and may thus indicate whether the particular data block was storing valid data for the file system, making it a previously-allocated data block, or whether the particular data block was not storing valid data for the file system, making it a newly-allocated data block. It should be appreciated, however, that determining whether a data block was previously allocated may be done in any suitable manner.

If it is determined in act 204 that the data block being analyzed was previously allocated, then in act 206 the snapshot facility may track and store information relating to the change in acts 206 and 208. In act 206, the original contents—the data of the data block of the production data volume 100 prior to the change—are copied from the data block to one of the data blocks 114 of the save volume 112. Once the original data is copied to the save volume 112, the new data may be permitted to be written to the production data block in the data volume 100.

In act 208, an entry is placed into a block map for the snapshot reflecting the change to the production data volume 100. The block map may be in any suitable format for tracking changes made to a data volume and may store any suitable information. One example of a block map is shown in data structure 300 in FIG. 3. In the exemplary block map 300, identifiers for the data blocks of both the production data volume 100 and the save volume 114 that are associated with a change may be stored in the block map 300. These identifiers may be the addresses for the data blocks. For example, the production data volume address may be the address of the data block of the production data volume 100 to which the data was written in the write operation, and the save volume address may be the address in the save volume of the data block storing the original contents of the data block of production data volume 100. Depending on the size of the data volumes, these addresses may be any suitable length. In some implementations, addresses of data blocks may be 32 bits in length, such that the data structure 300 may store 64 bits for each entry: a 32-bit address for the production data volume 100 and a 32-bit address for the save volume 112. For context, the example of FIG. 3 shows 32-bit addresses that may be held by a block map implemented as data structure 300, but it should be appreciated that this implementation is only illustrative and that any suitable data may be maintain by a block map.

In addition to storing any suitable information, the data structure of a block map may be implemented in any suitable manner. For example, the block map may be implemented using the known Btree data structure. Btrees offer fast access to data for a variety of reasons, and a binary search may be used to read from and/or write to the contents of the Btree. Btrees and binary searches are known in the art and will not be discussed further herein. It should be appreciated that Btrees are merely one illustrative data structure that may be employed to implement a block map and that binary searches are merely one technique for searching a block map data structure, as the aspects of the present invention described herein are not limited to use with any particular type of data structure to implement the block map, nor to any particular technique for searching for identifiers of particular data volumes in a block map.

If it is determined in act 204 that the particular data block is not a previously-allocated block—and is thus a newly-allocated block—then the snapshot facility may track and store information relating to the change in act 210. In act 210, an identifier for the newly-allocated data block is placed into a block map for the snapshot. In some implementations, the identifier for the newly-allocated data block comprises an indication that the data block is newly-allocated. The indication may be any suitable information, including a marker value. In the example of FIG. 3, the entry 302 may be used as the indication. The entry 302 may be one or more reserved values placed into the save volume address field for an entry in the data structure 300. The reserved value(s) may appear to be an address for a data block in the save volume 112, but may be recognized as an indication that the data block is newly-allocated and that, accordingly, there is no data in the save volume 112 related to the data block in the data volume 100.

Once the block map is updated in either of acts 208 or 210, the process 200 ends.

The process 200 of FIG. 2 may be executed for a single data block of a production data volume 100 to which a modification is made. Following creation of a snapshot for the production data volume 100, the process 200 may be repeated for each data block affected by changes to the production data volume 100, which may include multiple blocks for a single write operation, as well as multiple blocks for multiple different write operations. Operating a snapshot facility in this manner results in the creation of a block map having an entry for every data block that has been changed on the production data volume since creation of the snapshot, including both previously-allocated and newly-allocated data blocks. As discussed in further detail below, these entries may then be used by a replication module to identify all changes that have been made to the production data volume 100 and, accordingly, all changes that need to be replicated to a replication volume 104 to ensure that the data blocks 106 of the replication volume 104 are an accurate mirror of the data blocks 102 of the production data volume 100. In accordance with some embodiments of the present invention, multiple snapshots can be created serially, and when that occurs, updates to the block map and save volume are performed only for the most recently-created snapshot, so that using a snapshot to identify all changes made to the production data volume 100 subsequent to a particular point in time may involve examining the block map and save volume not only for the snapshot created at the particular point in time of interest, but also any subsequently created snapshot. However, it should be appreciated that the aspects of the present invention described herein are not limited in this respect, and can be employed with snapshot utilities in which all updates that occur to the production volume subsequent to the point in time at which a snapshot is created can be reflected in the data structures (e.g., the block map and save volume) of the snapshot itself.

As discussed above, a snapshot may, in some implementations, be used for multiple purposes. For example, a snapshot may be used for replication processes as well as backup/versioning processes. Accordingly, in some such implementations, such as the one shown in FIGS. 2 and 3, a snapshot may store information that may be used by a replication module for a replication process as well as information that may be used by a backup/versioning process to create a point in time copy. Such is the case with addresses for data blocks in the save volume 112. In some embodiments, a replication facility will examine the block map and use the data volume addresses to access and retrieve new data from changed data blocks in the production data volume 100, and will not consult the save volume 112 for data. Accordingly, in some such implementations wherein a snapshot is created to support replication, the block map may not be implemented according to the example of FIG. 3 and may not store information regarding the save volume 112. In other implementations, however, the snapshot may be created to also support by a backup/versioning process by forming a point in time copy so that overwritten data may be stored to the save volume 112 and reflected in the block map. Accordingly, it should be appreciated that any suitable information may be stored for any suitable reason in a block map or other data structures of a snapshot, including information not related to replication processes.

Figure 4:
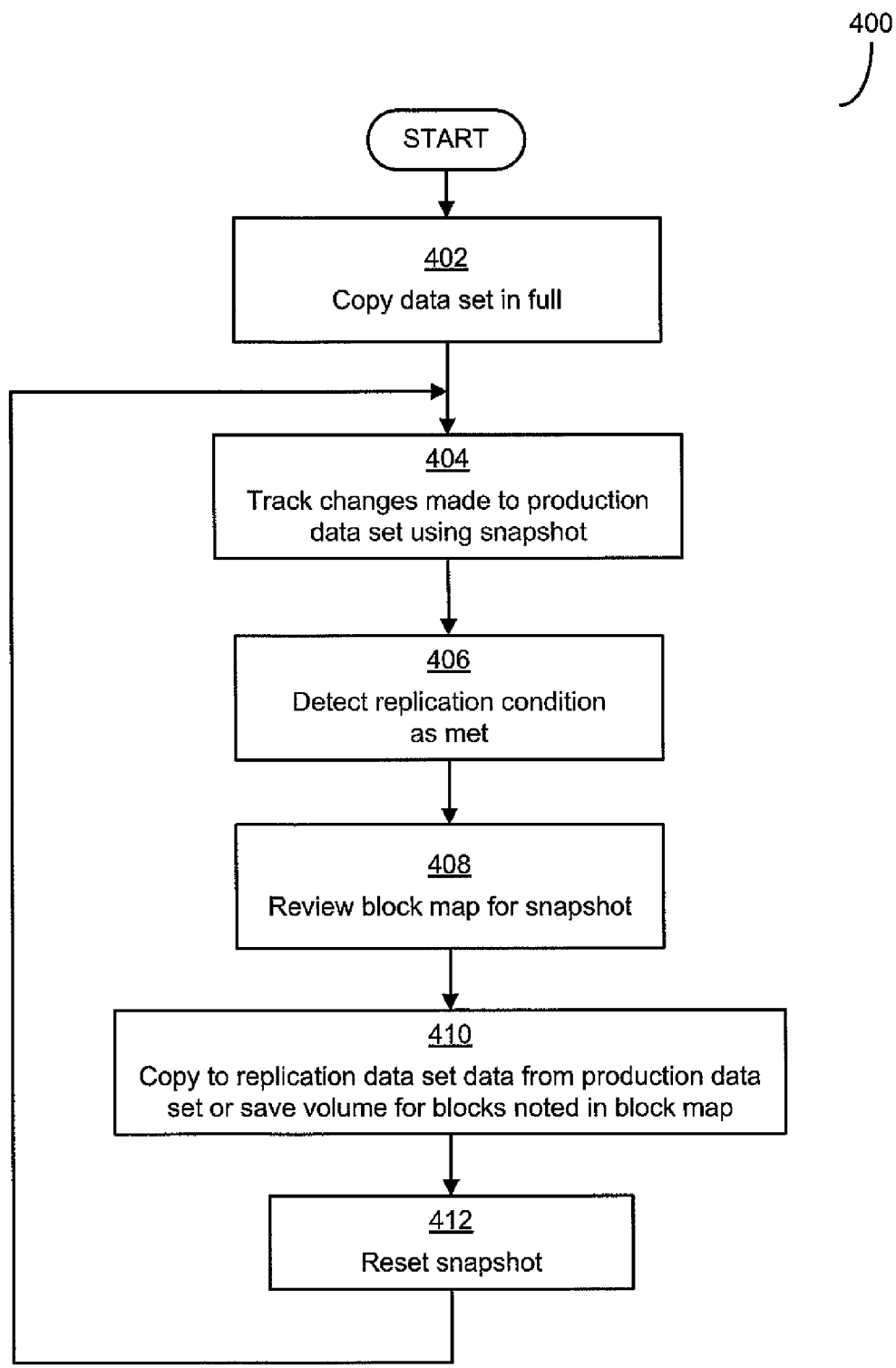
FIG. 4 is a flowchart of an illustrative technique for performing replication in accordance with some embodiments of the invention.

Replication processes may be carried out in any suitable manner. FIG. 4 shows one exemplary process for performing replication that may be implemented by a replication facility in accordance with some of the embodiments described herein. It should be appreciated, however, that the process 400 of FIG. 4 is merely illustrative of replication techniques that may be implemented, as embodiments of the invention are not limited in this respect. In the illustrative example described below, the replication process is described as operating on a data set. It should be appreciated that the data set may be any volume of storage or any collection of logical storage objects, such as a file system or a database, as the aspects of the present invention described herein are not limited to use with replicating any particular type of data set.

The process 400 of FIG. 4 begins in act 402, in which an initial copy of the data set 100 (e.g., data set 100 in FIG. 1) is made and written to a replication data set (e.g., replication production data set volume 104). In this manner, both volumes may be consistent at the start of a replication process. In some implementations, making a full copy of the production data set may take several minutes, hours, or even days, and in such implementations a snapshot may be placed at a starting point of the full-copy process of act 402 and changes made during the full-copy process may be tracked by the snapshot. In other implementations, a snapshot may be placed following completion of the full copy, or at any other time. Regardless of when the snapshot is created, in act 404 changes made to the production data set are tracked using the snapshot, and information regarding the changes is stored in data structures of the snapshot. Tracking changes may be done in any suitable manner, including by the exemplary process 200 described above in connection with FIG. 2, and information may be stored in any suitable manner, including in the illustrative block map 300 of FIG. 3.

Over time, these changes to the production data set are tracked by a snapshot module and stored in the snapshot. Then, in act 406, the replication facility may detect that at least one condition for a replication facility is met. Any suitable condition may be used as a signal that may trigger the replication facility to copy changes that have been tracked by a snapshot to the replication data set. For example, a time-based condition may be used, such as that a replication set be performed every minute, two minutes, or other suitable timeframe. As another example, a number- or size-based condition may be used, such as that a threshold number of data blocks have been changed or that a threshold amount of new data has been written to the production data set since the last replication. As another example, a condition could be completion of a previous replication process, such that replication is performed continuously. As another example, a condition of a replication process could be the creation of a new snapshot or application of a new snapshot to the production data set that will begin tracking changes, such that a previous snapshot can be read without concern that it will need to be updated during reading.

Regardless of the condition(s) for replication, once the condition(s) have been detected as met in act 406, then in act 408 the replication facility begins a replication process by examining one or more data structures of the snapshot to identify changes that have been made since creation of the snapshot. These data structures of the snapshot may be any suitable data structure, and in one embodiment include a block map data structure, such as the one described above in connection with FIG. 3. Through these data structures, the replication facility may identify a list of one or more data blocks that contain new data to be replicated to the replication data set to ensure that the replication data set is a mirrored copy of the production data set. As discussed above, the snapshot data structures may comprise information relating to both previously-allocated data blocks and newly-allocated data blocks—that is, data blocks that stored valid data before the snapshot was created and data blocks that did not store valid data before the snapshot was created.

In act 410, using the information from the data structures of the snapshot identifying the changed data blocks, the new data in the data blocks of the production data set that were changed since the snapshot was created is copied from the production data set to the replication data set. This may be done in any suitable manner, including by directly writing the data to the replication data set or by providing the new data to another intermediate component of the computer system, such as a file system server for the replication data set that may be the same or different from a file system server (e.g., file system server 108 in FIG. 1) for the production data set. In some implementations, data to be replicated may, in some cases, be read from data blocks in the save volume, rather than exclusively from the production data set. Such implementations are described in greater detail below.

Once the new data has been copied over in act 410, in act 412, in some embodiments wherein the snapshot is used solely to support replication, the snapshot may be reset to clear it of information relating to changes that have been replicated. Resetting the snapshot may be done in any suitable manner, and may include deleting all information containing the data structures. In this respect, some computer systems may have a limit on the number of snapshot that may be created because of the resources taken to create the data structures to implement a snapshot, so that when a snapshot is created solely to support replication, after it has been used to move the changed data to a replication data set, the snapshot may be deleted so as not to place a restriction on the number of other snapshots that the computer system may be able to create. However, in some other implementations, a snapshot may not be reset, but instead may be maintained to be used by other processes, such as processes that use it to form a point in time copy backup/versioning processes.

Once the snapshot has been reset (in implementations that do reset snapshots), the process may then return to act 404 to track, using a new snapshot, changes made to the production data set after the creation of the new snapshot and replicate those changes. In this way, a continuous replication process may be implemented such that the changes made to the production data set are always replicated to the replication data set as quickly as possible.

In some implementations, a replication process may be performed using two or more snapshots in series and switching between them. Such a technique may be used in a way that one or more snapshots may capture changes made to the production data set while another snapshot is being read by the replication facility during a replication process. In this way, a replication process may be carried out using one snapshot while another snapshot is recording changes made to the production data set, such that no time or efficiency is lost in writing to or reading from snapshots.

Figure 5:
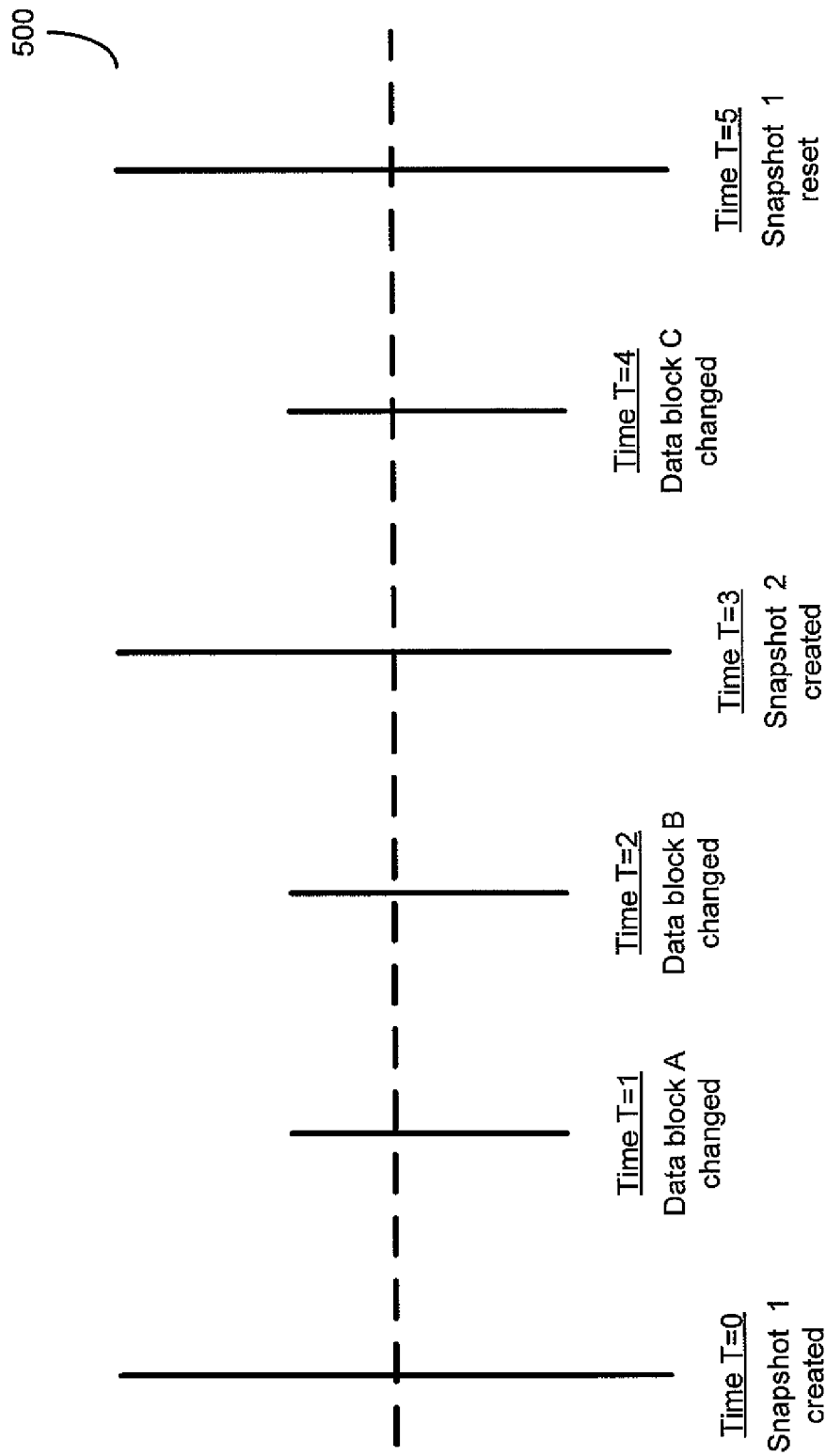
FIG. 5 is a timeline of exemplary operations that may result in changes to one or more data structures tracking changes made to a data volume in accordance with some embodiments of the invention.

One implementation of such a technique is shown on a timeline 500 in FIG. 5. In the timeline 500, at time T=0 a first snapshot, snapshot 1, is created and begins tracking changes made to the data volume after time T=0. Accordingly, the snapshot 1 stores in its data structures changes made to the production data volume at times T=1 and T=2, wherein data blocks A and B are changed. At time T=3, a new snapshot, snapshot 2, is created and begins tracking changes made to the production data volume 100 after time T=3. At this time, the snapshot 1 may stop tracking changes made to the data volume 100, as snapshot 2 is capturing information relating to the changes. A replication facility may then begin reviewing the snapshot 1 while the snapshot 2 is tracking changes, and may replicate to the replication data set the new data written by the changes tracked by snapshot 1—in this case, the new data written to data blocks A and B. During this time, while the replication module is replicating the changes, a change may be made to data block C of the production data set. This change is tracked by snapshot 2, and information relating to the change stored in the data structures of snapshot 2. At time T=5, the replication module may complete the replication process and reset snapshot 1. In this case, resetting the snapshot 1 may include clearing the data structures of information relating to replicated changes—the information relating to changes made to data blocks A and B—and creating a new snapshot to track changes made to the production data volume after time T=5. Accordingly, following time T=5, snapshot 1 tracks changes made to the production data volume, and snapshot 2 may be read by the replication facility to replicate changes made to the production data set to the replication data set (e.g., the new data written to data block C). At points in the future, off the timeline 500, the roles of snapshots 1 and 2 may be alternated again and again, with one snapshot tracking changes and another being read by the replication facility to replicate the tracked changes.

It should be appreciated, however, that the implementation shown in the timeline 500 of FIG. 5 is merely exemplary of one technique that may be used with multiple snapshots, and that other implementations using multiple snapshots are possible. Further, it should be appreciated that not all implementations of the principles described herein may use multiple snapshots, as in some implementations a single snapshot that is used over and over again may be sufficient to track and replicate changes made to a production data volume.

Further, it should be appreciated that the exemplary process 400 of FIG. 4 is only illustrative of the types of processes that may be implemented in embodiments of the invention. For example, while in FIG. 4, act 410 of the process 400 is described as reading the new data from the production data set, in some embodiments of the invention the replication facility may read contents of a data block from the production data set or from the save volume. This may be done for a variety of reasons. For example, to change the example of FIG. 5 slightly, if at time T=4 the data block B is changed again, then in some cases the contents of data block B may be read from the save volume. This may be done in the case where a replication facility begins a replication process at time T=3 (e.g., upon creation of the snapshot 2) and has not yet copied the new data of data block B as of time T=4. If the replication facility were to read the contents of data block B in the production data set after time T=4, then the contents will be those associated with the change made at time T=4. This can be done in some implementations, as it would be the most recent data in the data block. However, in other implementations it may be desired that the replication data set match the production data set as of a particular time, such as the start of the replication process (i.e., time T=3). In such implementations, the replication facility may, upon recognizing that a change has been made to data block B following the start of the replication process, read from the save volume the contents of the data block B that were copied to the save volume in response to the change made at time T=4 to ensure that the replicated data is accurately reflective of the state of the production data set at the particular time (e.g., time T=3). It should be appreciated, however, that this is only one example of the ways in which a replication process may be implemented, and that the aspects of the present invention are not limited to operating with any particular replication process.

In accordance with some embodiments of the present invention, the only snapshots that may be created are those created to support a replication process such as that discussed above. However, it should be appreciated that the aspects of the present invention described herein are not limited in this respect, and may also be used in connection with systems wherein snapshot may be created for other reasons, including by users or other aspects of the system to provide one or more point in time copies of the production data set being replicated. In accordance with one embodiment in the present invention, even when additional snapshots are created for other reasons, a snapshot created to support a replication process may continue to track all changes to the production data set until a new snapshot is created specifically for the purposes of supporting the replication process. Thus, in accordance with that embodiment of the present invention, only the replication snapshot may be examined to determine what data is to be updated to the replication data set to support the replication process at any particular point in time. However, in the alternative embodiment of the present invention, when another snapshot is created for any other purpose of (e.g., to create a point in time copy of the production data set), additional changes from that point going forward are not reflected directly in the snapshot created to support replication, but are only recorded in the most recently-created snapshot, so that when a determination is to be made about what data is to be replicated to the replication data set, in addition to examining the data structures of the snapshot created to support replication, the data structures for any subsequently-created snapshot may also be examined.

Figure 6:
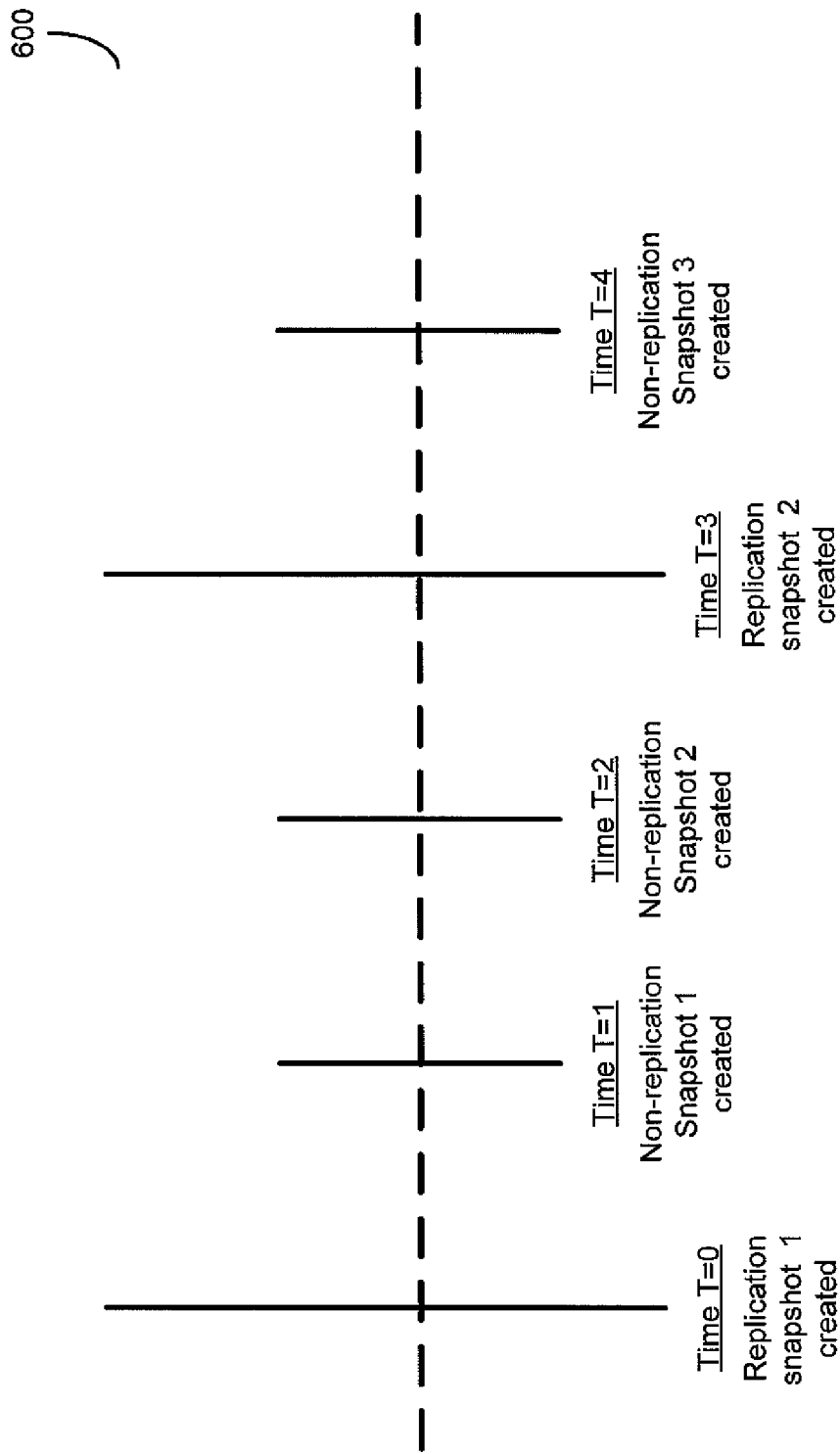
FIG. 6 is a timeline of exemplary snapshot operations that may result in changes to one or more data structures tracking changes made to a data volume in accordance with some embodiments of the invention.
Figure 7:
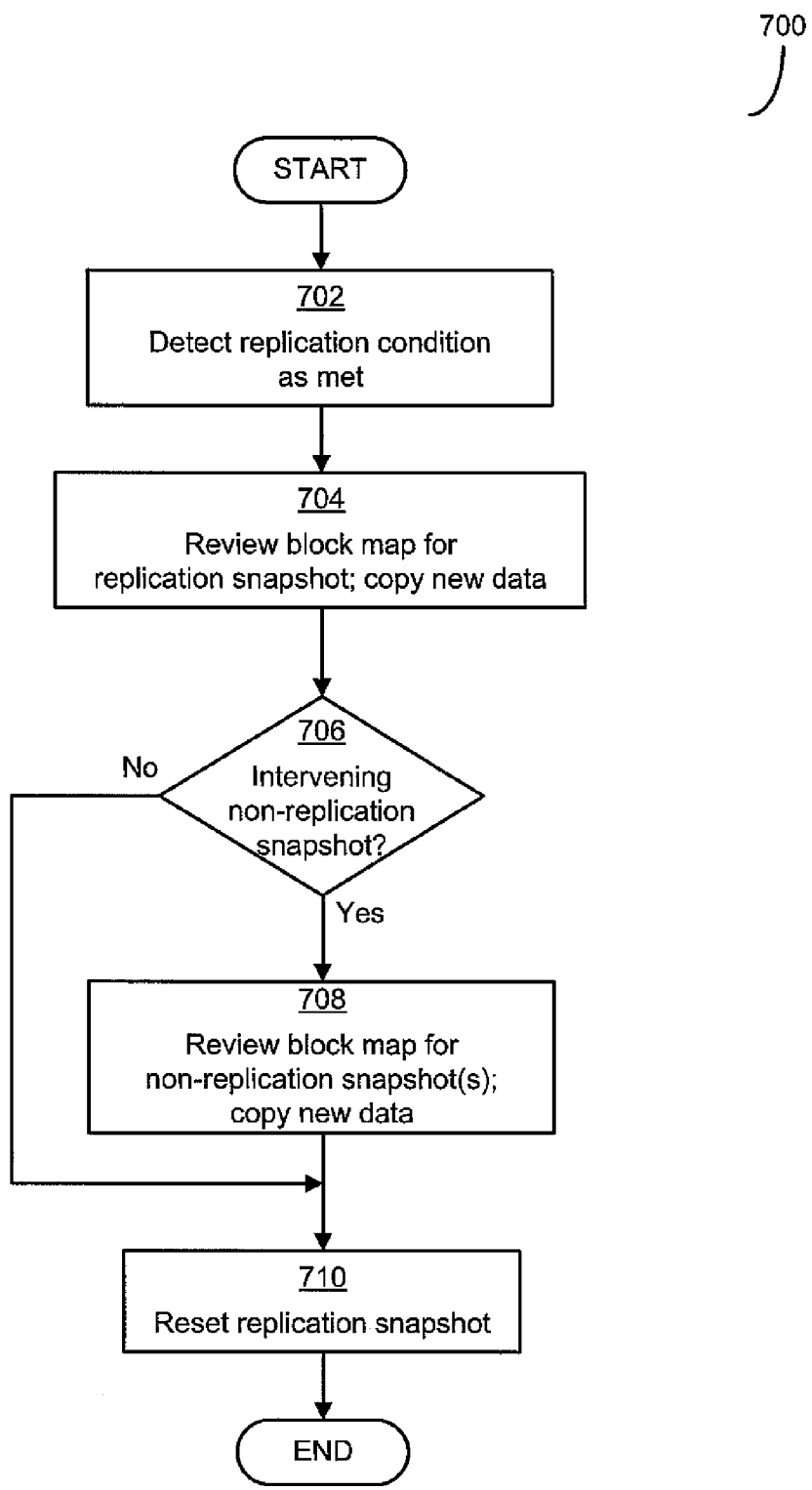
FIG. 7 is a flowchart of an illustrative technique for performing replication in a system having both user snapshots and replication snapshots that may be implemented in accordance with some embodiments of the invention.

FIG. 7 shows a flowchart of an exemplary process for reviewing multiple snapshots, including one or more snapshots created for other reasons (e.g., to create a point in time copy) in addition to a snapshot created to support replication. To provide context for this discussion, FIG. 6 shows a timeline 600 illustrating an exemplary placement of both snapshots created to support replication (referred to as replication snapshots) and snapshots created for other purposes, such as to create a point in time copy (referred to as non-replication snapshots).

In the timeline 600 of FIG. 6, at time T=0 a replication snapshot is created or applied to the production data set to begin tracking changes made to it. Replication snapshot 1 does this until time T=1. At time T=1, a non-replication snapshot 1 is created and, as any other snapshot, it begins tracking some or all of the changes made to the production data set. When the non-replication snapshot 1 begins tracking changes, the replication snapshot 1 stops tracking changes. At time T=2, a second non-replication snapshot is created, non-replication snapshot 2, and begins tracking changes. Finally, at time T=3 and time T=4, a second replication snapshot and a third non-replication snapshot are created and begin tracking changes.

When non-replication snapshots such as non-replication snapshots 1, 2, and 3 are created/applied and assume responsibility for tracking changes made to a production data set then the replication snapshots cease having a full set of information regarding changed data blocks on the data volume 100. To determine all the data blocks that were changed between times T=1 and T=3—the time between the replication snapshots—the system may consult all of the intervening snapshots.

In some implementations, a replication facility may carry out a replication process upon creation of any new snapshot, including snapshots created exclusively to support replication and snapshots created for any other reason (e.g., to create a point in time copy). Accordingly, in some implementations in which snapshots may be created for other reasons in addition to support replication, it may not be necessary to consult more than one snapshot to perform a replication process. In other implementations, however, to copy all of the data that has been updated to the production volume subsequent to the creation of the most recent snapshot created to support replication, a replication process may consult with multiple snapshots, including those created for reasons unrelated to replication and that may have been created subsequent to the snapshot most recently created to support replication.

FIG. 7 shows one technique that may be implemented for reviewing multiple replication and non-replication snapshots during a replication process. The process 700 of FIG. 7 begins in act 702, in which a replication facility detects that at least one replication condition has been met and thus launches a replication process. In act 704, the replication facility may then review data structures associated with a replication snapshot in any suitable manner, such as by using any of the techniques described above (e.g., those in connection with FIG. 4). Using the information from the data structures associated with the replication snapshot, in act 704 the new data in each of the changed data blocks of the production data set may be copied to the replication data set.

In act 706, the replication facility determines whether any non-replication snapshots have been created/applied between the time the replication snapshot was applied and the time the replication process is being performed. If not, then the replication snapshot is reset in block 710 and the process ends. If there is at least one non-replication snapshot, though, then the non-replication snapshot(s) should be examined to determine whether they also contain information regarding changed data blocks containing new data that should be replicated to the replication data set. In act 708, the data structures of each of these one or more non-replication snapshots are examined to identify changed data blocks on the production data set and to replicate data stored in each of those data blocks to the replication data set. The information for each of these data blocks is read from the production data set (e.g., in the same manner as from the replication snapshot), and written to the replication data set in any suitable manner. Once each of the non-replication snapshots has been examined and the new data in each of the data blocks identified by the non-replication snapshots has been replicated, the replication snapshot is reset in block 710, and the process 700 ends.

Entries may be placed into a block map in any suitable manner. In some implementations, a snapshot facility may update a block map each time a change to a data block is detected. In other implementations, however, inserting entries into the block map may be a costly process in terms of system resources, and instead some or all of the entries may be held and aggregated, and then inserted into the block map in bulk. For example, entries may be placed into the block map according to a threshold associated with a "syncpoint." A syncpoint may use any suitable threshold to detect when to write contents of a buffer to the block map, such as when a sufficient number of entries have been compiled or when a certain amount of time has passed. Prior to reaching the threshold, block map entries may be placed into one or more buffers and held until written to the block map. The buffers may contain all entries to be inserted into the block map, or may contain only a certain type of entry. For example, in one implementation only entries associated with newly-allocated data blocks may be placed in a buffer, as entries associated with previously-allocated blocks will have written data regarding the entry to the save volume when the original data of a data block is copied over to the save volume. In some implementations, more than one buffer may be used, such as in the case where one buffer stores information regarding new changes while the contents of another buffer are written to the block map, and then the roles reverse, to ensure that no time is lost and no detected changes are lost during an operation that reads the contents of the buffer. In some implementations, four buffers may be used, but this is merely an example as any suitable number of buffers may be used.

Figure 8:
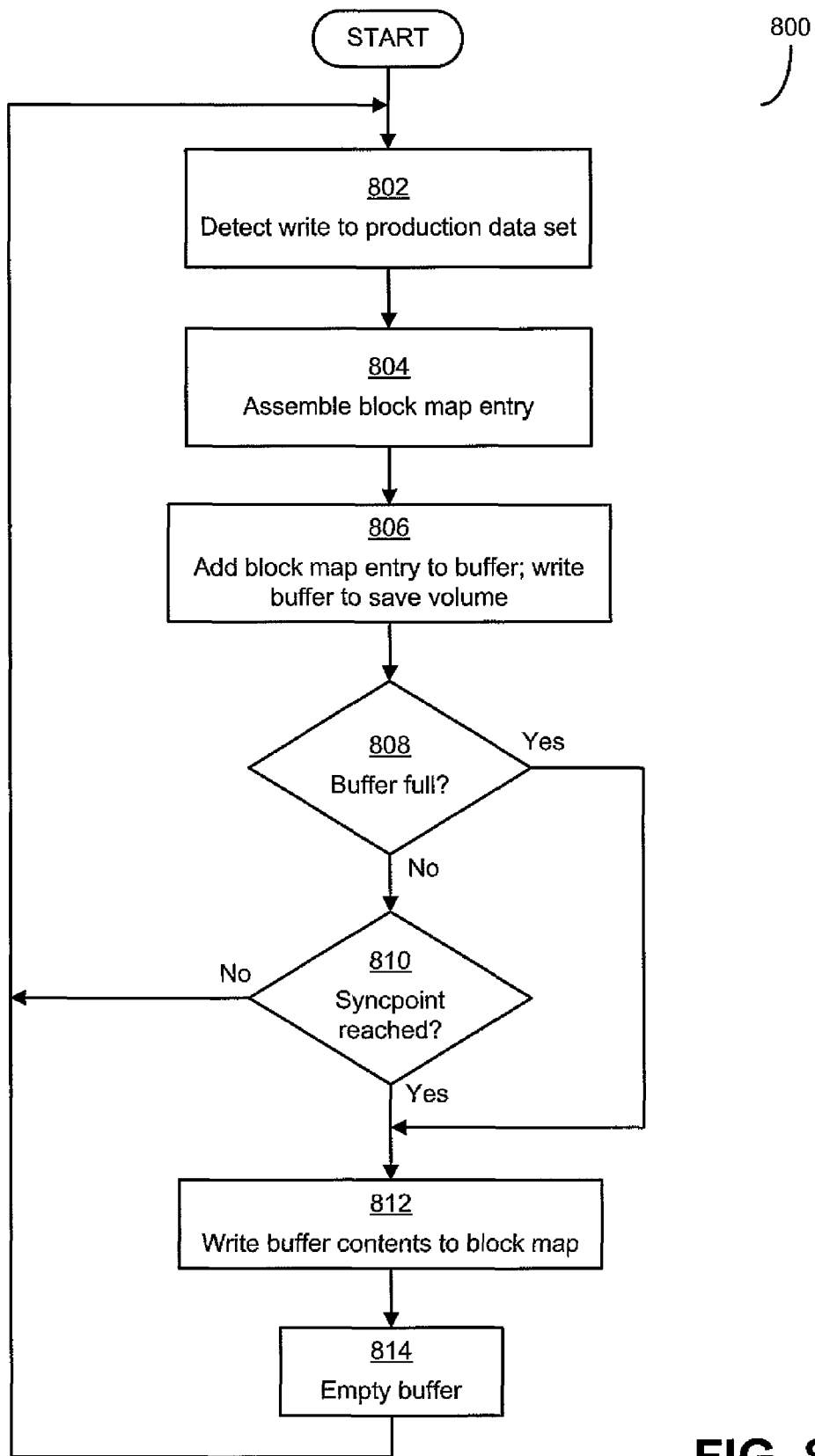
FIG. 8 is a flowchart of an illustrative technique for using buffers for updating a snapshot with information relating to changes made to a data volume that may be implemented in accordance with some embodiments of the invention.

FIG. 8 shows one exemplary technique for tracking changes in accordance with some of the principles described herein. It should be appreciated that the process 800 of FIG. 8 is merely illustrative of the types of processes that may be implemented in embodiments that use buffers, and that implementations are possible that use other processes or that do not use buffers.

In the example of FIG. 8, information stored in the buffers is written to the save volume 112 (FIG. 1) or other persistent data store each time new information is received and prior to being inserted into the block map. This may be done to ensure that information that is temporarily stored in a buffer is recoverable in the event of a catastrophic error or crash of the data storage system. In the event of a crash, by writing the information to a persistent data store it may be retrieved later and inserted into the block map at a later time, rather than lost forever. If the entries to be inserted into the block map could be lost in the event of a crash, then to ensure that replication was completed properly a replication facility might have to do a complete scan of the production data set and compare it to the replication data set to ensure that all changed blocks were noted and replicated. If, however, the entries could be retrieved from a persistent data store following the crash, these entries could be written to the block map as usual and a replication process performed normally.

The process 800 of FIG. 8 begins in act 802, wherein a snapshot facility detects that an operation, such as a write operation, is to be executed that would result in a change of the contents of a data block. In act 804, a block map entry is assembled in any suitable manner, such as by writing the original contents of the data block to the save volume 112 (FIG. 1) and identifying the address of the data block storing the original contents in the save volume 112 or by noting that the block is newly-allocated. Once the block map entry is assembled, it may be added to an available buffer in act 806 and all the contents of the buffer written to the save volume 112. In some cases, all the contents of the buffer may include the block map entry just placed in the buffer as well as other block map entries that had been previously placed in the buffer and already written to the save volume 112. This may be done to ensure that all block map entries are properly written to the save volume 112, and that nothing may be missed or lost as a result of a system crash or other error.

In act 808, it is determined whether, after the insertion of the block map entry in block 806, the buffer is full. If not, then in act 810 it is determined whether a syncpoint has been reached. This may be done in any suitable manner, depending on the threshold(s) associated with the syncpoint, and may be done regardless of the state of the buffer at the time of the syncpoint. For example, a buffer may not be full when a syncpoint is reached, but the contents of the buffer will be written to the block map regardless if the threshold is reached. This may be done to ensure that entries are placed into the block map in a timely manner, and to ensure that the block map is not far out of sync with the state of the production data set. If a syncpoint has been reached, or if it is determined in act 806 that the buffer is full, then in act 812 the contents of the buffer—the one or more block map entries—are written to the block map. In some cases, the block map may then also be written to the save volume 112, to ensure that it, also, is maintained in a persistent store and is not lost in the event of a crash. In act 814, once the entries in the buffer are written to the block map, the buffer is emptied to clear it of the written entries.

Once the contents of a buffer have been written to the block map, or if it is determined in acts 808 and 810 that the buffer is not full and that a syncpoint has not been reached, the program flow returns to act 802 where the buffer may be used to track more changes made to a production data set that should be tracked by the snapshot.

Figure 9:
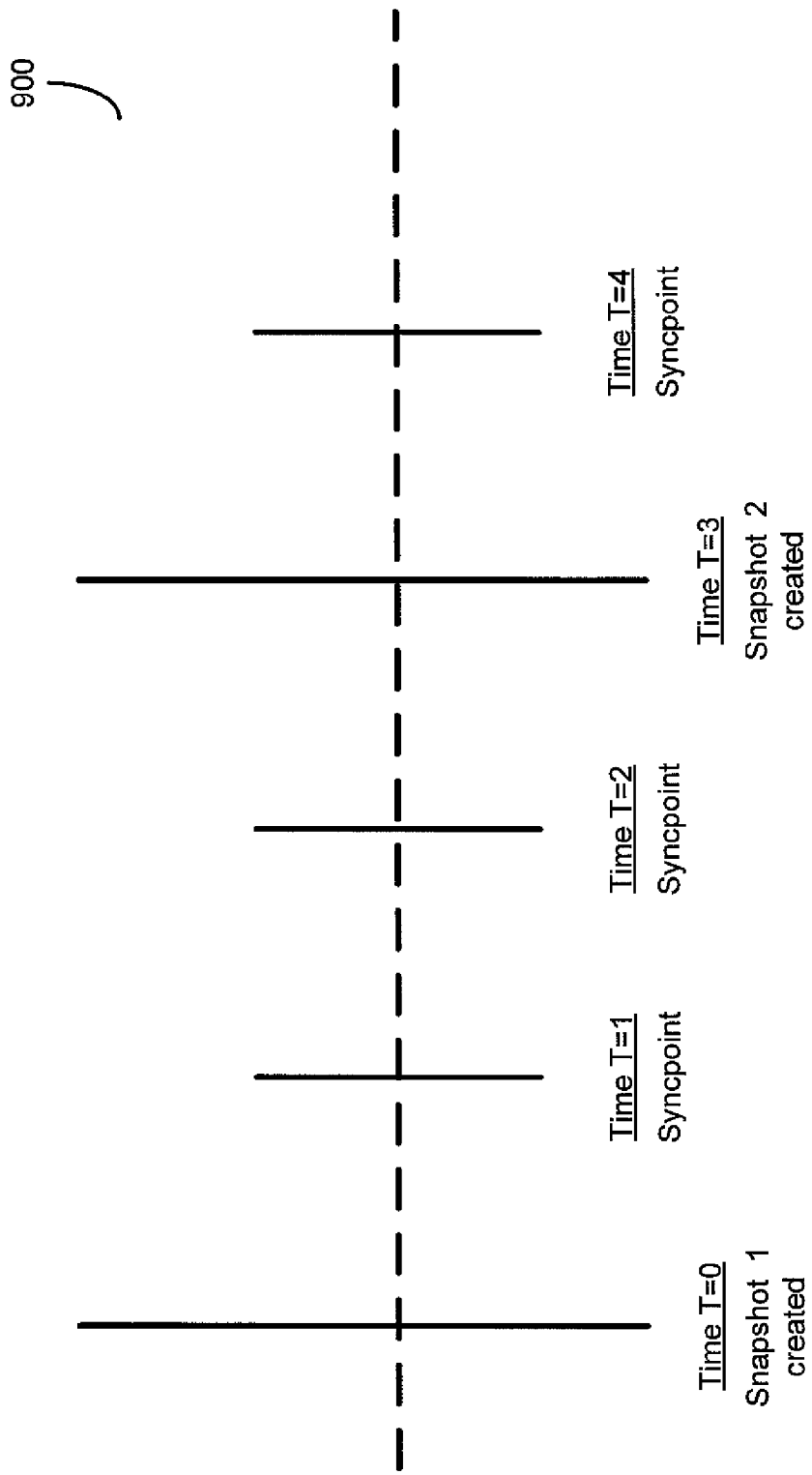
FIG. 9 is a timeline of exemplary snapshot events that may result in changes to one or more data structures tracking changes made to a data volume in accordance with some embodiments of the invention.

FIG. 9 shows a timeline 900 of snapshots and syncpoints that may be seen in one implementation of some of the principles described herein. At time T=0, a snapshot 1 is created and changes made to the production data set are tracked and stored in the data structures of the snapshot. In this implementation, in accordance with some of the principles described herein, one or more buffers may be used to track the changes made to the production data set such that entries are only occasionally inserted into the block map. The entries may be inserted according to one or more syncpoints. In the timeline 900, the conditions of two syncpoints are met at times T=1 and T=2. Between T=0 and T=1, a buffer may store entries relating to changes made to the production data set, and at time T=1 the contents of that buffer may be inserted into the block map. Between times T=1 and T=2, a buffer again tracks changes made to the production data set, and at time T=2 the contents of the buffer are written to the block map. At time T=3, a second snapshot is created, snapshot 2, and entries regarding changes made to the production data set are written to a buffer until time T=4, when they are written to the block map.

Figure 10:
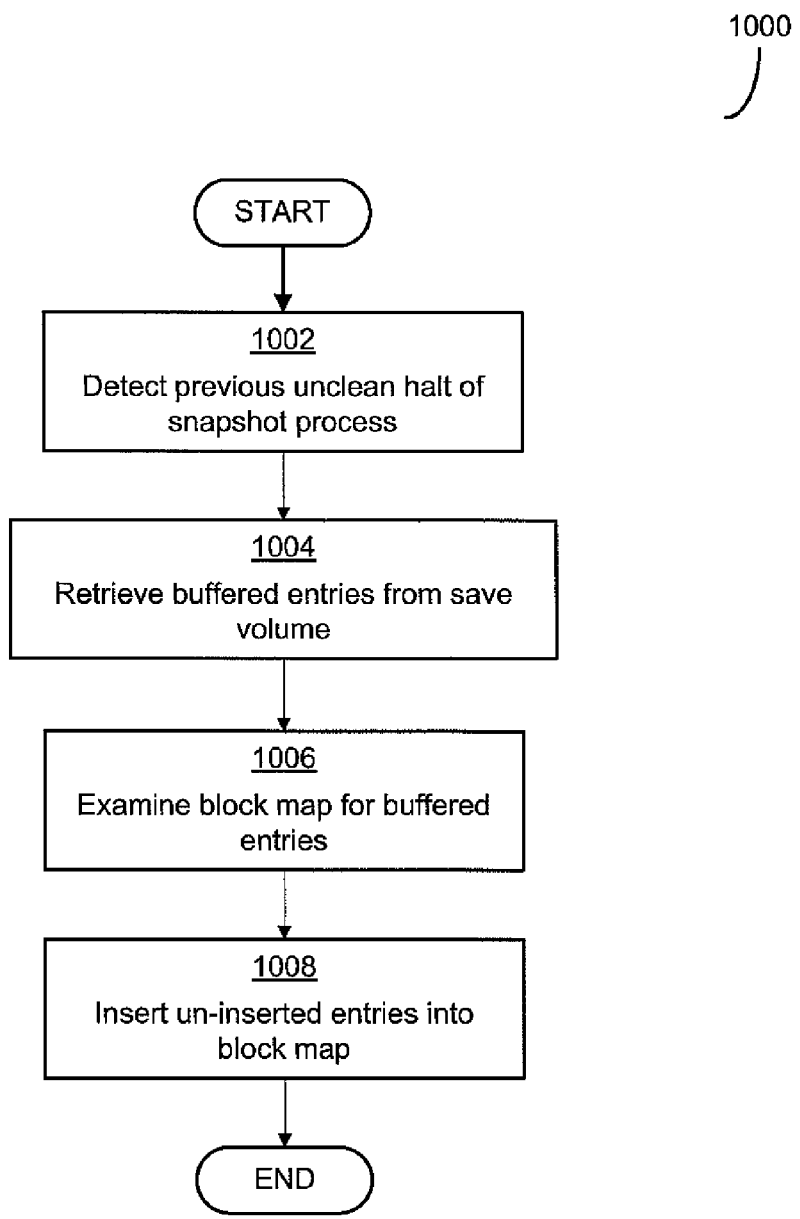
FIG. 10 is a flowchart of an illustrative technique for recovering a replication process following a halt of a replication process that may be implemented in accordance with some embodiments of the invention.

As discussed above, writing buffer contents to the save volume prior to insertion to the block map at a syncpoint may be done to ensure that information is not lost in the event of a failure or halt of the snapshot process. FIG. 10 shows one exemplary process for recovering from a failure or halt by reading the contents of the buffer from the save volume. It should be appreciated, however, that any suitable process may be used for recovering from a failure or halt of a snapshot process, as embodiments of the invention are not limited in this respect.

The exemplary process 1000 begins in act 1002, wherein a previous unclean halt of the snapshot process is detected. An unclean halt that leaves some entries un-inserted into the block map may be caused by any of a number of events. For example, a computing device executing a snapshot facility may be powered off or restarted, or the snapshot facility may crash as a result of an error, or any other suitable event. In act 1002, it may be detected that the snapshot process was halted when the snapshot facility is restarted and discovers that it was uncleanly shut down and needs to initiate a recovery process, or when the snapshot facility is in the process of being halted, or at any other suitable time. In act 1004, upon detecting that the snapshot was halted, buffered block map entries that had been written to the save volume may be retrieved from the save volume. In act 1006, each of these buffered entries is compared to the block map to determine whether a particular entry had been previously inserted into the block map and had not been removed from the save volume following the insertion. If the entry had been inserted into the block map, then the entry may be discarded. If, however, an entry is found in the save volume that had not been inserted into the block map, then in act 1008 the un-inserted entry may be inserted into the block map to ensure that the block map reflects that entry and the change made to the production data set that is associated with that entry. In this way, the block map will be ensured to be an accurate representation of the changes made to the production date set following creation of the snapshot associated with the block map, and it can be certain that a replication facility reading the block map will be able to copy over all new data written to the production data set since creation of the snapshot.

Snapshots implemented in accordance with some of the principles described herein may be used by replication processes to identify data blocks that have been changed such that new data stored in the data blocks can be replicated to a replication volume. In some implementations, snapshots created to support replication are not limited to being used by replication processes, and may additionally or alternatively be used by backup/versioning processes or other processes. For example, in some systems wherein only the most recently-created snapshot tracks changes to any particular data set, the creation of the replication snapshot to support a replication process may result in changes no longer being tracked by a non-replication snapshot (e.g., created to establish a point in time copy), so that to accurately determine a point in time copy created by a previously-created non-replication snapshot, the changes tracked by a replication snapshot may need to be considered. Snapshots as created by some of the techniques described herein, however, may store information (e.g., reflecting writes to previously unallocated data blocks) that may not be relevant to other processes. Accordingly, these processes may, in some implementations, be modified to detect this information that is irrelevant to these processes and ignore it.

Figure 11:
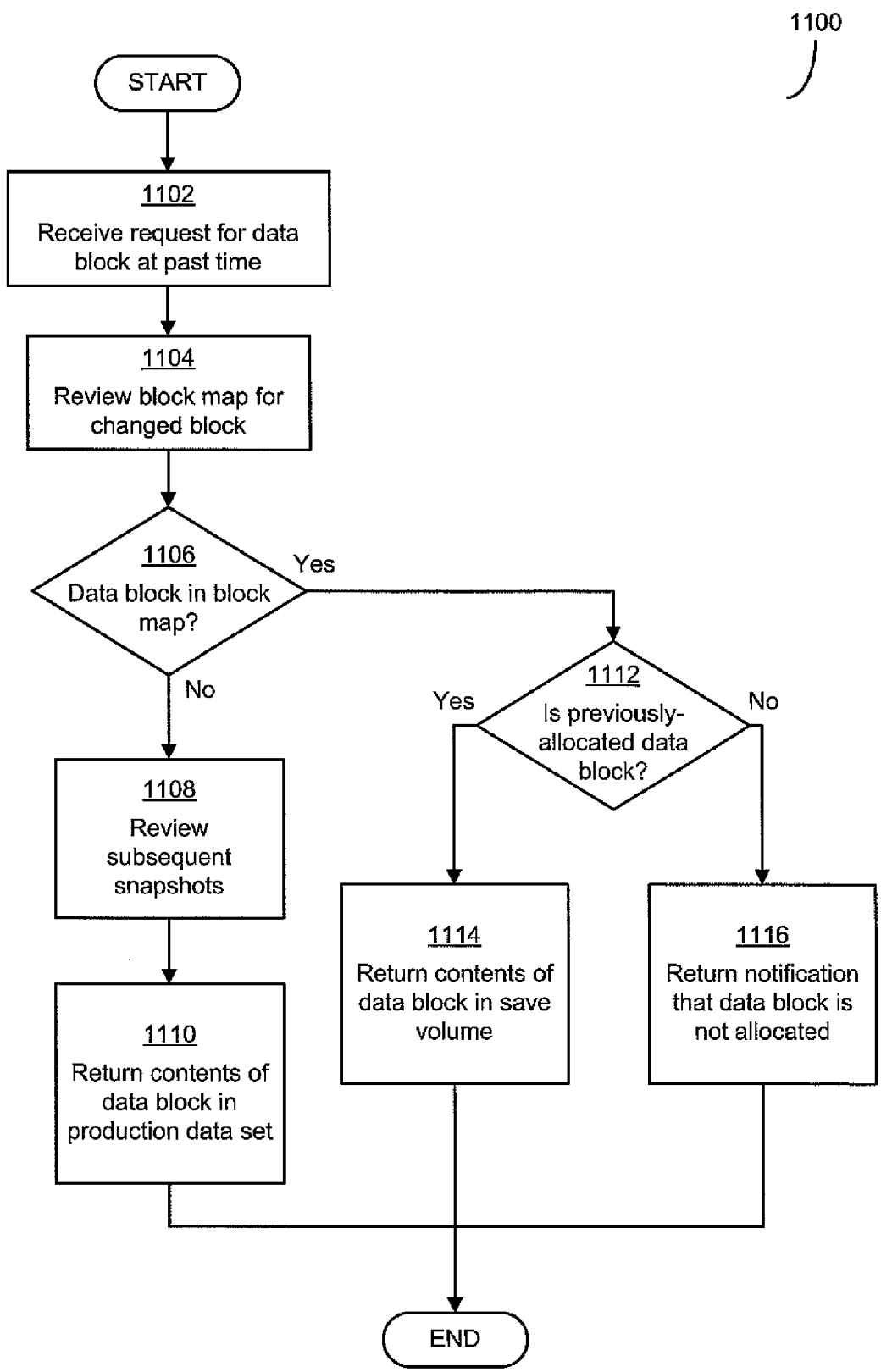
FIG. 11 is a flowchart of an illustrative technique a backup/versioning module may use when reading a snapshot implemented in accordance with some embodiments of the invention.

FIG. 11 shows one such modification to a process that may use snapshots for reasons other than replication (e.g., to create a point in time copy). The flowchart of FIG. 11 is a process for reading a snapshot to enable access to the point in time copy of the data set at the time the snapshot was formed (e.g., by a backup/versioning process). For example, a user may attempt to read a snapshot associated with a point in time to determine contents of one or more storage objects (e.g., files) at that point in time. FIG. 11 shows one technique that may be used for using a snapshot implemented according to some of the principles described herein for this purpose. It should be appreciated, however, that a snapshot may be read by a backup/versioning or other non-replication process in any suitable manner, and that the process of FIG. 11 is only illustrative of techniques that may be used.

The process 1100 of FIG. 11 begins in act 1102, wherein a non-replication facility receives a request for a data block at a particular point in time. This request could be received in any suitable manner, such as by a user requesting from the file system server 108 the contents of a file at the particular point in time, and the file system server 108 requesting from a backup/versioning process the contents of a particular data block associated with a portion of that file at the particular point in time. In act 1104, the block map for the snapshot associated with the particular point in time is reviewed to determine whether the block map contains an entry for the particular data block. If it is determined in act 1106 that the data block is not in the block map, then in block 1108 the process 1100 may be carried out for any other snapshot that had been applied after the snapshot being examined. If no snapshot at or after the particular point in time contains an entry for the data block, then in block 1110 the contents of the data block in the data volume are returned as the contents of the production data block at the particular point in time. This may be done because, based on the information in the snapshots, it could be determined that no change has been made to the data block since the particular point in time—because no change has been tracked by a snapshot—so the current contents of the data block of the data volume are the contents of that data block at the particular point in time. After the contents are returned, the process ends.

If, however, it is determined in act 1106 that a change to the data block was tracked in the snapshot, then in act 1112 it is determined whether the data block was previously allocated at the time of the change. If so, then the contents of the data block at the time of the change are contained in a data block of the save volume, because the original contents of the previously-allocated data block were written to the save volume at the time of the change. If, however, it was a newly-allocated data block, then there were no valid original contents and, accordingly, there was no data in the data block at the particular point in time. Determining whether an entry in a block map of a snapshot is associated with a previously-allocated data block or a newly-allocated data block may be done in any suitable manner. In some implementations, for example, determining whether a data block was previously-allocated may comprise examining, for the entry in the block map related to the data block, an address for a save volume data block to determine whether the entry contains one or more marker values associated with newly-allocated data blocks discussed above in connection with FIGS. 2 and 3. If the save volume address is a marker value, then it can be determined that the data block was newly-allocated. If, however, it is not a marker value, then it can be determined to have been previously allocated.

If the data block is determined to be previously-allocated, then in act 1114 the contents of the save volume data block identified in the block map are retrieved and returned as the contents of the data block at the particular point in time. If, however, it is determined that the data block was not previously allocated, then in act 1116 any suitable notification may be returned that the data block was not allocated at the particular point in time. This notification may be a message to the effect that the data block was not allocated, or may be a null value returned as the contents of the data block, or it may be any other suitable notification. Once the notification is returned in either of act 1114 or 1116, then the process 1100 ends.

Techniques operating according to some or all of the embodiments described herein may be implemented in any suitable manner. For example, in some embodiments, the techniques may be implemented as computer-executable instructions encoded on one or more computer-readable storage media such as magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. The computer-readable storage media may be implemented as computer-readable storage media 1206 of FIG. 12 (i.e., as a portion of a computing device 1200) or as a separate computer storage medium. It should be appreciated that, as used herein, a "computer-readable medium," including "computer-readable storage medium," refers to tangible storage media having at least one physical property that may be altered in some way during a process of recording data thereon. For example, a magnetization state of a portion of a physical structure of a computer-readable medium may be altered during a recording process.

In some such embodiments, the computer-executable instructions implementing the techniques operating in accordance with the principles described herein may be implemented as one or more stand-alone functional facilities (e.g., the replication facility described above). As described above, a "functional facility" is a structural component of a system which performs a specific operational role, however instantiated, which may be a portion of or an entire software element (e.g., a function or a discrete process). Generally, functional facilities include routines, programs, objects, components, data structures, etc. that perform particular tasks or implement particular abstract data types. Typically the functionality of the functional facilities may be combined or distributed as desired in various embodiments. These functional facilities may, in some implementations, be adapted to interact with other, unrelated functional facilities and/or processes, such as functional facilities implementing a software program application or implementing an operating system for a computing device, or, in other implementations, the modules may be adapted to interact with other functional facilities which, together with the modules, form an overall system such as an operating system, including the Celerra Data Access in Real Time (DART) operating system, available from the EMC Corporation of Hopkinton, Mass. In other words, in some implementations, the functional facilities may be implemented alternatively as a portion of or outside of an operating system. It should also be appreciated that, in some implementations, some functional facilities may be implemented separately from others, or some functional facilities may not be implemented.

In some, but not all implementations, the techniques may be embodied as computer-executable instructions that may be executed on any suitable computing device(s) operating in any suitable computer system, including the exemplary computer system of FIG. 1. These computer-executable instructions may be implemented in any suitable manner, including as a number of functional facilities, each providing one or more operations needed to complete execution of such techniques. Each functional facility may be implemented in its own way; all need not be implemented the same way. As used herein, a functional facility is a structural component of a system that performs an operational role. The operational role may be a portion of or an entire software element. For example, a functional facility may perform a function of a process, a discrete process, or any other suitable unit of processing. A functional facility may comprise computer-executable instructions, and, as discussed further below, may be encoded on one or more computer-readable storage media. Additionally, such computer-executable instructions may be written using any of a number of suitable programming languages and/or programming or scripting tools, and also may be compiled as executable machine language code or intermediate code that is executed on a framework or virtual machine. Functional facilities may be executed in parallel or serially, as appropriate, and may pass information between one another using a shared memory on the computer on which they are executing, using a message passing protocol or in any other suitable way.

Exemplary functional facilities are described herein for carrying out one or more tasks, though it should be appreciated that the functional facilities and division of tasks described is merely illustrative of the type of functional facilities that may implement the exemplary techniques described herein, and that the invention is not limited to being implemented in any specific number, division, or type of functional facilities. In some implementations, all functionality may be implemented in a single functional facility.

These functional facilities may operate on a single multi-purpose programmable digital computer apparatus, a coordinated system of two or more multi-purpose computer apparatuses sharing processing power and jointly carrying out the techniques described herein, a single computer apparatus or coordinated system of computer apparatuses (co-located or geographically distributed) dedicated to executing the techniques described herein, one or more application-specifics integrated circuits (ASICs) for carrying out the techniques described herein, one or more Field-Programmable Gate Arrays (FPGAs) for carrying out the techniques described herein, or any other suitable system.

Figure 12:
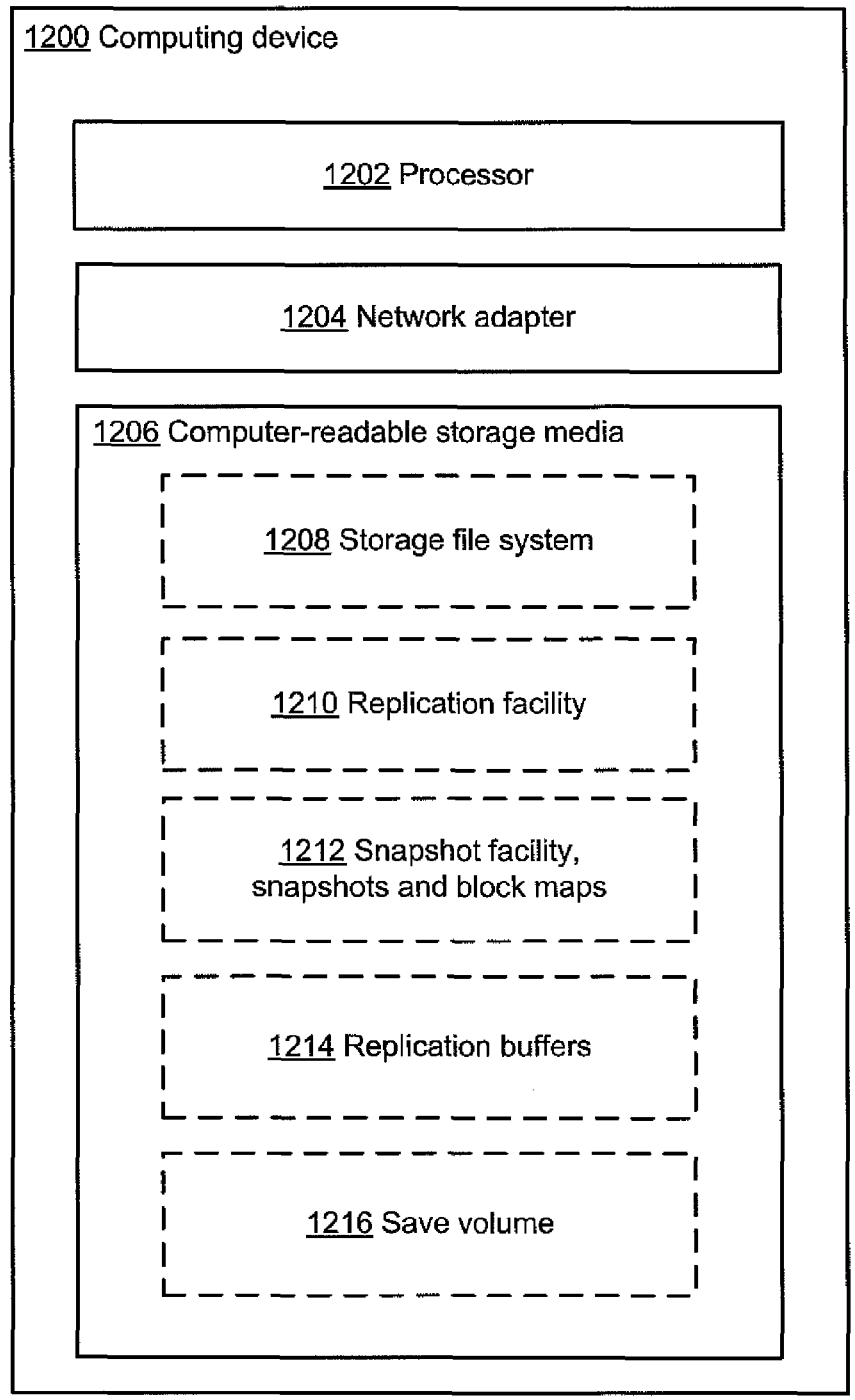
FIG. 12 is a block diagram of a computing device on which functional modules implementing some of the techniques described herein may execute.

FIG. 12 illustrates one exemplary implementation of a computing device in the form of a computing device 1200 that may be used in a system implementing the techniques described herein, although others are possible. Further, it should be appreciated that FIG. 12 is intended neither to be a depiction of necessary components for a computing device to operate in accordance with the principles described herein, nor a comprehensive depiction.

Computing device 1200 may comprise a processor 1202, a network adapter 1204, and computer-readable storage media 1206. Computing device 1200 may be, for example, a desktop or laptop personal computer, a workstation, a server, a mainframe, a smart phone, or any other suitable computing device. Network adapter 1204 may be any suitable hardware and/or software to enable the computing device 1200 to communicate with any other suitable computing device over any suitable computing network. The computing network may be any suitable wired and/or wireless communication medium or media for exchanging data between two or more computers, including the Internet. In some implementations, network adapter 1204 may be implemented as two or more separate network adapters, offering connectivity via two or more types of network interfaces (e.g., a wired network adapter such as an Ethernet adapter and a wireless network adapter such as an IEEE 802.11g adapter). Computer-readable storage media 1206 may be any suitable tangible storage medium adapted to store data to be processed and/or instructions to be executed by processor 1202. Processor 1202 enables processing of data and execution of instructions. The data and instructions may be stored on the computer-readable storage media 1206 and may, for example, enable communication between components of the computing device 1200.

The data and instructions stored on computer-readable storage media 1206 may comprise computer-executable instructions implementing techniques which operate according to the principles described herein. In the example of FIG. 12, computer-readable storage media 1206 stores computer-executable instructions implementing various modules and storing various information as described above. Computer-readable storage media 1206 may store data related to a storage file system 1208, including, for example, instructions relating to the management of the file system and records containing information about the file system such as records regarding allocation of data blocks to one or more files. Computer-readable storage media 1206 may also include a replication facility 1210 to perform replication using snapshots according to any of the exemplary techniques described above or variations thereon. A snapshot facility 1212, as well as snapshots created by the snapshot module and block maps of the snapshots, may be stored on computer-readable storage media 1206. The snapshots generated by snapshot facility 1212 may be used by the replication module in a replication process, or any other suitable module for any other process.

Buffers 1214 may also be stored on the computer-readable storage media 1206, storing information waiting to be placed into the snapshots 1212, and, in some implementations, the save volume 1216 may be a portion of the computer-readable storage media 1206.

Computing device 1200 may be implemented in any suitable computer system. In some implementations, it may be a component of the exemplary computing system of FIG. 1. For example, the computing device 1200 may be implemented as the file system server 108. It should be appreciated, however, that the computing device 1200 may be implemented in any suitable computer system.

Figure 13A:
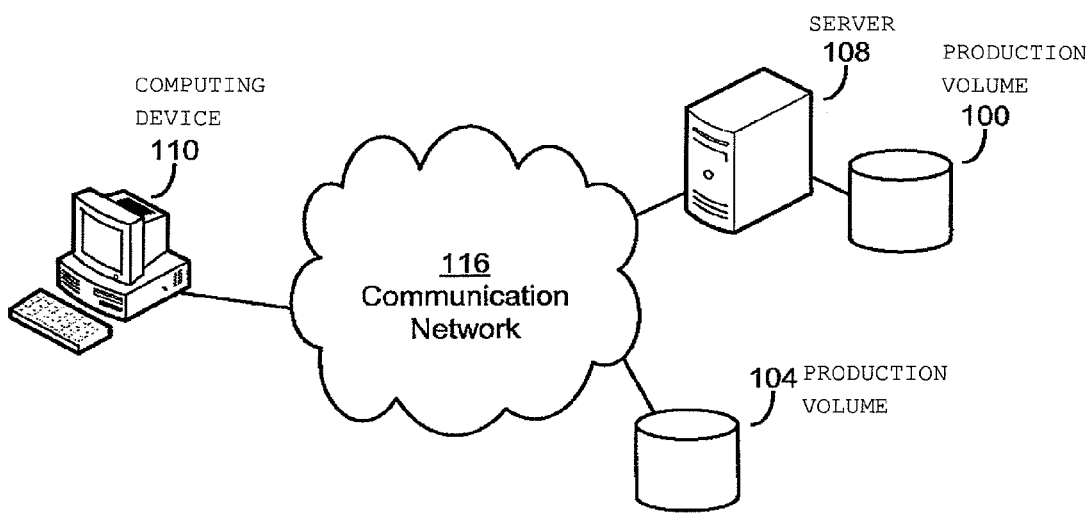
FIGS. 13A, 13B, and 13C illustrate exemplary computer systems in which techniques operating according to some embodiments of the invention may act.
Figure 13B:
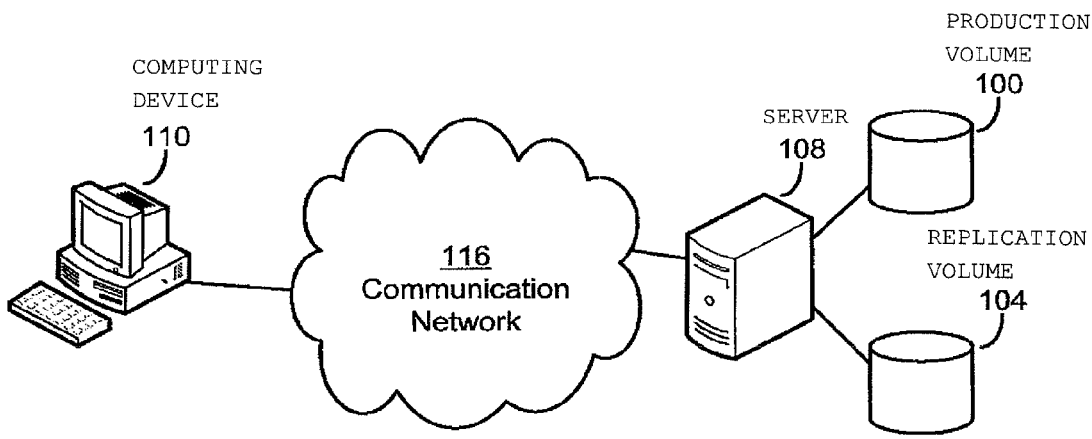
Figure 13C:
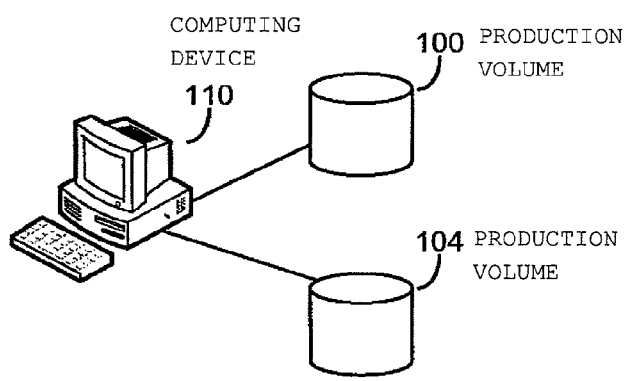

FIGS. 13A, 13B, and 13C show other examples of computer systems in which some implementations of the principles described herein may act, and in which a computing device 1200 may operate. In FIG. 13A, a client computing device 110 may issue a write operation to write some data to the data volume 100. In this implementation, the write operation may travel over the communication network 116 to the file system server 108. The file system server 108 may then write the operation to data volume 100. In this implementation, data volume 100 is a component of the file system server 108 and accessible to it locally. Changes made to the data volume 100 may then be replicated to the replication volume 104, which is separate from the file system server 108 and accessible via the communication network 116.

In FIG. 13B, similar to FIG. 13A, a client computing device 110 may issue a write operation to write some data to data volume 100, and this operation may travel over the communication network 116 to the file system server 108. The file system server 108 may then write the data to the data volume 100. In this implementation, as in FIG. 13A, the data volume 100 may be a component of the file system server 108 and accessible to it locally. Changes made to the data volume 100 may then be replicated to the replication volume 104, which is also, in this implementation, a component of file system server 108 and accessible to it locally.

In FIG. 13C, a client computing device 110 may act as the file system server 108 in that data volume 100 is a component of the client computing device 110 and accessible to it locally, rather than over a network. In this implementation, the client computing device 110 may write data to the data volume 100, and changes made to the data volume 100 may be replicated to the replication volume 104, which is also a component of the client computing device 110.

Various computer systems in which techniques operating in accordance with one or more of the principles described herein may act. It should be appreciated, however, that these computer systems are merely illustrative of the types of computer systems in which techniques operating according to these principles may act and that any suitable computer system may be used.

It should be appreciated that various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of tracking changes to a file system subsequent to a point in time, the file system storing data in units of storage on at least one storage medium, the method comprising, in response to an operation that results in writing a first set of data to the file system subsequent to the point in time, acts of:

(A) determining whether the operation results in the file system writing at least a first portion of the first set of data to at least one first unit of storage that was previously allocated to the file system and stored data for the file system, and when it is determined that the operation results in the file system writing at least the first portion of the first set of data to at least one first unit of storage that was previously allocated to the file system and stored data for the file system, performing acts of:

(A1) creating a first entry in at least one map indicating that the at least one first unit of storage is being modified subsequent to the point in time;

(A2) copying data stored in the at least one first unit of storage prior to the operation to at least one save volume; and (A3) writing at least the first portion of the first set of data to the at least one first unit of storage;

(B) determining whether the operation results in the file system writing at least a second portion of the first set of data to at least one second unit of storage, the at least one second unit of storage being newly allocated for the operation and that did not store valid data for the file system prior to the operation, and when it is determined that the operation results in the file system writing at least the second portion of the first set of data to the at least one second unit of storage that did not store valid data for the file system, performing acts of:

(B1) creating a second entry, different from the first entry, in the at least one map indicating that the at least one second unit of storage is newly allocated for the operation and is being modified subsequent to the point in time; and (B2) writing at least the second portion of the first data to the at least one second unit of storage without copying any data stored in the at least one second unit of storage to the at least one save volume; and (C) tracking changes to the file system subsequent to the point in time using the first entry and the second entry in the at least one map, wherein the first entry indicates that data related to the first entry is stored in the save volume, and wherein the second entry indicates that no data related to the second entry is stored in the save volume.

2. The method of claim 1, wherein creating the second entry in the at least one map includes indicating that the at least one second unit of storage did not store valid data for the file system previous to the operation.

3. The method of claim 2, wherein the first entry created in (A1) indicates in a first portion of the first entry an address in the at least one save volume to which the data was copied in act (A2), and the second entry created in the act (B1) indicates in the first portion of the entry that the at least one second unit of storage did not store valid data for the file system.

4. The method of claim 1, wherein creating the first entry and the second entry in the at least one map in each of the acts (A1) and (B1) comprises:
  temporarily storing the first entry and the second entry in at least one buffer;
  aggregating the first and the second entries in the at least one buffer; and
  writing the first and the second entries from the at least one buffer into the at least one map.

5. The method of claim 4, wherein the act of temporarily storing the first entry and the second entry in at least one buffer comprises storing the entries to the at least one save volume.

6. The method of claim 1, wherein determining in acts (A) and (B) whether the first and second units of storage stored data for the file system comprises examining information stored by the file system indicating an allocation of units of storage to files managed by the file system, and determining whether the first and second units of storage was allocated to at least one file managed by the file system.

7. The method of claim 1, further comprising:
  reading at least one entry in the at least one map to identify at least one unit of storage storing new data that should be replicated to at least one second storage medium that is to be kept as a mirror of the at least one storage medium.

8. The method of claim 1, wherein the operation is a first operation, and wherein the method further comprises:
  repeating acts (A) and (B) for a second operation that writes a second set of data to the file system, wherein the second operation occurs after the first operation; and
  wherein step (C) includes, after the second operation, separately tracking changes to the file system occurring as a result of the first operation and as a result of the second operation using the at least one map.

9. At least one non-transitory computer-readable storage medium having encoded thereon computer-executable instructions that, when executed by at least one computer, perform a method for tracking changes to a file system subsequent to a point in time, the file system storing data in units of storage on at least one storage medium, the method comprising, in response to an operation that results in writing a first set of data to the file system subsequent to the point in time, acts of:
  (A) determining whether the operation results in the file system writing at least a first portion of the first set of data to at least one first unit of storage that was previously allocated to the file system and stored data for the file system, and when it is determined that the operation results in the file system writing at least the first portion of the first set of data to at least one first unit of storage that was previously allocated to the file system and stored data for the file system, performing acts of:
    (A1) creating a first entry in at least one map indicating that the at least one first unit of storage is being modified subsequent to the point in time;
    (A2) copying data stored in the at least one first unit of storage prior to the operation to at least one save volume; and
    (A3) writing at least the first portion of the first set of data to the at least one first unit of storage;
  (B) determining whether the operation results in the file system writing at least a second portion of the first set of data to at least one second unit of storage, the at least one second unit of storage being newly allocated for the operation and that did not store valid data for the file system prior to the operation, and when it is determined that the operation results in the file system writing at least the second portion of the first set of data to at least one second unit of storage that did not store valid data for the file system, performing acts of:
    (B1) creating a second entry, different from the first entry, in the at least one map indicating that the at least one second unit of storage is newly allocated for the operation and is being modified subsequent to the point in time; and
    (B2) writing at least the second portion of the first data to the at least one second unit of storage without copying any data stored in the at least one second unit of storage to the at least one save volume; and
  (C) tracking changes to the file system subsequent to the point in time using the first entry and the second entry in the at least one map, wherein the first entry indicates that data related to the first entry is stored in the save volume, and wherein the second entry indicates that no data related to the second entry is stored in the save volume.

10. The at least one computer-readable storage medium of claim 9, wherein creating the second entry in the at least one map indicating that the at least one second unit of storage did not store valid data for the file system previous to the operation.

11. The at least one computer-readable storage medium of claim 10, wherein the first entry created in (A1) of the method indicates in a first portion of the first entry an address in the at least one save volume to which the data was copied in act (A2), and the second entry created in the act (B1) of the method indicates in the first portion of the second entry that the at least one second unit of storage did not store valid data for the file system.

12. The at least one computer-readable storage medium of claim 9, wherein creating the first entry and the second entry in the at least one map in the acts (A1) and (B1) of the method comprises:
  temporarily storing the first entry and the second entry in at least one buffer;
  aggregating the first and the second entries in the at least one buffer; and
  writing the first and the second entries from the at least one into the at least one map.

13. The at least one computer-readable storage medium of claim 12, wherein the act of temporarily storing the first entry and the second entry in the at least one buffer comprises storing information regarding the first entry and the second entry to the at least one save volume.

14. The at least one computer-readable storage medium of claim 9, wherein determining in acts (A) and (B) of the method whether the first and second units of storage stored data for the file system comprises examining information stored by the file system indicating an allocation of units of storage to files managed by the file system, and determining whether the first and second units of storage was allocated to at least one file managed by the file system.

15. The at least one computer-readable storage medium of claim 9, wherein the method further comprises:
  reading at least one entry in the at least one map to identify at least one unit of storage storing new data that should be replicated to at least one second storage medium that is to be kept as a mirror of the at least one storage medium.

16. The at least one computer-readable storage medium of claim 9, wherein the operation is a first operation, and wherein the method further comprises:
repeating acts (A) and (B) for a second operation that writes a second set of data to the file system, wherein the second operation occurs after the first operation; and
wherein step (C) includes, after the second operation, separately tracking changes to the file system occurring as a result of the first operation and as a result of the second operation using the at least one map.

17. An apparatus, comprising:
at least one processor programmed to track changes to a file system subsequent to a point in time, the file system storing data in a plurality of units of storage of at least one storage medium, the at least one processor programmed to, in response to an operation that results in writing a first set of data to the file system subsequent to the point in time:
(A) determine whether the operation results in the file system writing at least a first portion of the first set of data to at least one first unit of storage that was previously allocated to the file system and stored data for the file system, and when it is determined that the operation results in the file system writing at least the first portion of the first set of data to at least one first unit of storage that was previously allocated to the file system and stored data for the file system, perform acts of:
(A1) creating a first entry in at least one map indicating that the at least one first unit of storage is being modified subsequent to the point in time;
(A2) copying data stored in the at least one first unit of storage prior to the operation to at least one save volume; and
(A3) writing at least the first portion of the first set of data to the at least one first unit of storage; and
(B) determine whether the operation results in the file system writing at least a second portion of the first set of data to at least one second unit of storage that did not store valid data for the file system, and when it is determined that the operation results in the file system writing at least the second portion of the first set of data to at least one second unit of storage that did not store valid data for the file system, perform acts of:
(B1) creating a second entry, different from the first entry, in the at least one map indicating that the at least one second unit of storage is newly allocated for the operation and is being modified subsequent to the point in time; and
(B2) writing at least the second portion of the first data to the at least one second unit of storage without copying any data stored in the at least one second unit of storage to the at least one save volume; and
(C) tracking changes to the file system subsequent to the point in time using the first entry and the second entry in the at least one map, wherein the first entry indicates that data related to the first entry is stored in the save volume, and wherein the second entry indicates that no data related to the second entry is stored in the save volume.

18. The apparatus of claim 17, wherein creating the second entry in the at least one map includes indicating that the at least one second unit of storage did not store valid data for the file system previous to the operation.

19. The apparatus of claim 18, wherein the first entry created in (A1) indicates in a first portion of the first entry an address in the at least one save volume to which the data was copied in act (A2), and the second entry created in the act (B1) indicates in the first portion of the second entry that the at least one second unit of storage did not store valid data for the file system.

20. The apparatus of claim 17, wherein creating the first entry and the second entry in the at least one map in the acts (A1) and (B1) comprises:
temporarily storing the first entry and the second entry in at least one buffer;
aggregating the first and the second entries in the at least one buffer; and
writing the first and the second entries from the at least one buffer into the at least one map.

21. The apparatus of claim 17, wherein determining in acts (A) and (B) of the method whether the first and second units of storage stored data for the file system comprises examining information stored by the file system indicating an allocation of units of storage to files managed by the file system, and determining whether the first and second units of storage was allocated to at least one file managed by the file system.

22. The apparatus of claim 17, wherein the at least one processor is further programmed to:
read at least one entry to at least one unit of storage storing new data that should be replicated to at least one second storage medium that is to be kept as a mirror of the at least one storage medium.

23. The apparatus of claim 17, wherein the operation is a first operation, and wherein the processor performs acts further comprising:
repeating acts (A) and (B) for a second operation that writes a second set of data to the file system, wherein the second operation occurs after the first operation; and
wherein act (C) includes, after the second operation, separately tracking changes to the file system occurring as a result of the first operation and as a result of the second operation using the at least one map.

* * * * *